United States Patent [19]
Suzuki et al.

[11] Patent Number: 5,471,243
[45] Date of Patent: Nov. 28, 1995

[54] ELECTRONIC STILL CAMERA

[75] Inventors: Masao Suzuki, Tokyo; Kazuyuki Matoba, Yokohama; Yuji Sakaegi, Kawasaki; Takashi Sasaki, Yokohama, all of Japan

[73] Assignee: Canon Kabushiki Kaisha, Tokyo, Japan

[21] Appl. No.: 260,039

[22] Filed: Jun. 15, 1994

Related U.S. Application Data

[63] Continuation of Ser. No. 10,495, Jan. 28, 1993, abandoned, which is a continuation of Ser. No. 575,382, Aug. 28, 1990, abandoned.

[30] Foreign Application Priority Data

Aug. 31, 1989 [JP] Japan ................................ 1-225366
Nov. 28, 1989 [JP] Japan ................................ 1-306495
Nov. 28, 1989 [JP] Japan ................................ 1-306496

[51] Int. Cl.$^6$ ............................................. H04N 9/07
[52] U.S. Cl. .................................... 348/234; 348/317
[58] Field of Search ........................ 348/230, 234–236, 348/294–295, 305, 317; H04N 9/04, 9/07, 5/14, 5/335

[56] References Cited

U.S. PATENT DOCUMENTS

| | | | |
|---|---|---|---|
| 4,054,915 | 10/1977 | Sugihara | 358/41 |
| 4,641,183 | 2/1987 | Kinoshita | 358/41 |
| 4,700,220 | 10/1987 | Masuda et al. | 358/41 |
| 4,814,865 | 3/1989 | Takei et al. | 358/44 |
| 4,825,291 | 4/1989 | Mimura et al. | . |
| 4,924,316 | 5/1990 | Kobayashi et al. | 358/44 |
| 5,155,584 | 10/1992 | Taguchi et al. | 358/41 |
| 5,194,944 | 3/1993 | Uchiyama et al. | 358/41 |
| 5,249,041 | 9/1993 | Shiraishi | 358/44 |

FOREIGN PATENT DOCUMENTS

| | | |
|---|---|---|
| 247562 | 12/1987 | European Pat. Off. . |
| 289944 | 11/1988 | European Pat. Off. . |
| 58-127492 | 7/1983 | Japan . |
| 2170374 | 7/1986 | United Kingdom . |

*Primary Examiner*—Edward L. Coles, Sr.
*Assistant Examiner*—Kim Yen Vu
*Attorney, Agent, or Firm*—Robin, Blecker, Daley & Driscoll

[57] ABSTRACT

In an electronic still camera including an image pickup element having color filters which are changed at one-pixel periods in a vertical direction, and the memory outputs from the image pickup elements are temporarily stored in a memory and are read out again to obtain frame data.

12 Claims, 21 Drawing Sheets

FIG. 1A (PRIOR ART)

|  | COLUMN 1 | 2 | 3 | 4 | 5 | 6 | — — — — — — — — — |
|---|---|---|---|---|---|---|---|
| ODD EVEN | ROW |  |  |  |  |  |  |
| ← ← | 1 | R | G | R | G | R | G |
| ← | 2 | R | G | R | G | R | G |
| ← | 3 | B | G | B | G | B | G |
| ← | 4 | B | G | B | G | B | G |
| ← | 5 | R | G | R | G | R | G |
| ← | 6 | R | G | R | G | R | G |
| ← | 7 | B | G | B | G | B | G |
|  | ⋮ |  |  |  |  |  |  |
|  | Z-1 |  |  |  |  |  |  |
| ← | Z | B | G | B | G | B | G |

FIG. 1B (PRIOR ART)

|  | COLUMN 1 | 2 | 3 | 4 | 5 | 6 | — — — — — — — |
|---|---|---|---|---|---|---|---|
| ODD EVEN | ROW |  |  |  |  |  |  |
| ← | 1 | Mg+Yl | G+Cy | Mg+Yl | G+Cy | Mg+Yl | G+Cy |
| ← | 2 | Mg+Yl | G+Cy | Mg+Yl | G+Cy | Mg+Yl | G+Cy |
| ← | 3 | G+Yl | Mg+Cy | G+Yl | Mg+Cy | G+Yl | Mg+Cy |
| ← | 4 | G+Yl | Mg+Cy | G+Yl | Mg+Cy | G+Yl | Mg+Cy |

FIG. 2
(PRIOR ART)

| | | | | |
|---|---|---|---|---|
| Mg | Gr | Mg | Gr | |
| Cy | Ye | Cy | Ye | |
| Gr | Mg | Gr | Mg | |
| Cy | Ye | Cy | Ye | |
| Mg | Gr | Mg | Gr | |
| | | | | |

(n) → row 1
(m) → row 2
(n+1) → row 3
(m+1) → row 4

TWO PIXELS PERIOD

FIG. 13A

```
COLUMN  1   2   3   4   5   6  — — — — — — — — — —
ROW
  1    | R | G | B | G | R | G |  — — — — — — — — —
  2    | B | G | R | G | B | G |  — — — — — — — — —
  3    | R | G | B | G | R | G |  — — — — — — — — —
  4    | B | G | R | G | B | G |  — — — — — — — — —
  5    | R | G | B | G | R | G |  — — — — — — — — —
  6    | B | G | R | G | B | G |  — — — — — — — — —
  7    | R | G | B | G | R | G |  — — — — — — — — —
  ⋮
 Z-1
  Z    | B | G | R | G | B | G |  — — — — — — — — —
```

FIG. 13B

```
COLUMN  1    2    3    4    5    6   — — — — — — — — —
ROW
  1    | G  | Mg | G  | Mg | G  | Mg |  — — — — — — —
  2    | Yl | Cy | Yl | Cy | Yl | Cy |  — — — — — — —
  3    | Mg | G  | Mg | G  | Mg | G  |  — — — — — — —
  4    | Yl | Cy | Yl | Cy | Yl | Cy |  — — — — — — —
  5    | G  | Mg | G  | Mg | G  | Mg |  — — — — — — —
  6    | Yl | Cy | Yl | Cy | Yl | Cy |  — — — — — — —
  7    | Mg | G  | Mg | G  | Mg | G  |  — — — — — — —
  ⋮
 Z-1
  Z    | Yl | Cy | Yl | Cy | Yl | Cy |  — — — — — — —
```

FIG. 16

| W | G | W | G | |
|---|---|---|---|---|
| Cy | Ye | Cy | Ye | |
| W | G | W | G | |
| Cy | Ye | Cy | Ye | |
| | | | | |

ELECTRONIC STILL CAMERA

This is a continuation application under 37 CFT 1.62 of prior application Ser. No. 08/010,495, filed Jan. 28, 1993, which is a continuation divisional application under 37 CFR 1.62 of prior application Ser. No. 575,382, filed Aug. 28, 1990, both abandoned.

BACKGROUND OF THE INVENTION

1. Field of the Invention

The present invention relates to an electronic still camera for photographing a still image using a memory.

2. Related Background Art

In order to obtain frame data of still images (obtain two, i.e., odd and even fields) using an electronic still camera, an image pickup element comprising color filters which repetitively appear at two-pixel periods in the vertical direction shown in FIG. 1A or 1B must be used. As shown in FIGS. 1A and 1B, since a conventional image pickup element alternately reads out odd- and even-numbered rows in odd and even fields, the two outputs must be the same.

However, when the image pickup element comprising the color filters shown in FIG. 1A or 1B is used, two row data obtained from every other row, for example, 1st- and 3rd-row signals for an odd field, and 2nd- and 4th-row signals for an even field must be used to extract luminance signals and color signals. For this reason, since a vertical distance between data becomes large, vertical correlation is reduced, and a generated amount of false colors is increased.

In signal processing, a large number of 1H delay lines are required to extract luminance and color signals.

When interlaced scanning is performed using an image pickup element (e.g., a CCD: charge-coupled device) having color filters aligned as shown in FIG. 2, in, e.g., a video movie camera which can perform a field-sequential read operation, vertically read access ((n)th and (m)th rows are mixed and read out in the first field, and (m)th and (n+1)th rows are mixed and read out in the second field) thereby alternately outputting a line having signals $C_1=(Mg+Cy)$ and $C_2=(Gr+Ye)$ and a line having signals $C_3=(Mg+Ye)$ and $C_4=(Gr+Cy)$ in respective fields.

Therefore, luminance (Y) signals can be obtained in respective lines as $Y^1=C^1+C^2=(Mg+Gr+Cy+Ye)$ and $Y^2=C^3+C^4=(Mg+Gr+Cy+Ye)$, and color signals are obtained as difference signals between adjacent pixels like $C_b=C_1-C_2$ and $C_r=C_3-C_4$. Therefore, color difference signals given by the following equations are output for each line.

$$C_b = (Mg + Cy) - (Gr + Ye) \quad (1)$$
$$= (B + R + B + Gr) - (Gr + Gr + R)$$
$$= 2B - G$$

$$C_r = (Mg + Ye) - (Gr + Cy) \quad (2)$$
$$= (B + R + Gr + R) - (Gr + Gr + B)$$
$$= 2R - G$$

The Y and C signals are then subjected to signal processing such as band limitation, γ-conversion, white balance adjustment, and the like, normally executed in each field although not shown, thus obtaining a frame image.

However, an image pickup device such as a still video camera exclusively used for a frame-sequential read operation cannot perform vertical two-pixel mixing read access in units of fields unlike in a movie camera. Therefore, if the color filters aligned as shown in FIG. 2 are used, only Mg and Gr data are obtained in the first field, and only Cy and Ye data are obtained in the second field. Thus, a frame image cannot be obtained by a conventional arrangement.

SUMMARY OF THE INVENTION

It is an object of the present invention to solve the conventional problems.

According to an aspect of the present invention, there is provided an image pickup system which can eliminate false colors caused by high-frequency components in a vertical direction and does not require delay lines for deriving color and luminance signals, by arranging an image pickup element using color filters which are changed at one-pixel periods in the vertical direction, and a memory, wherein an image pickup output is temporarily stored in the memory, and is read out again.

It is another object of the present invention to provide an image pickup apparatus for performing a frame read operation which can provide a signal equivalent to that obtained by a field read operation in consideration of the above situation.

In order to achieve the above object, according to another aspect of the present invention, a field memory is used, and an image pickup apparatus is arranged as in item (1) below.

(1) An image pickup apparatus for performing a frame read operation by interlaced scanning an image pickup element comprising color filters, comprises the following constituting elements a and b:

a. a luminance signal processing unit including means for storing a first-field signal in a first field memory at a first timing, means for outputting a sum of the signal stored in the first field memory and a second-field signal as a new first-field signal at a second timing, means for storing a sum of the signal stored in the first field memory and a signal obtained by delaying the second-field signal by one horizontal scanning period in the first field memory at the second timing, and means for outputting the sum stored in the first field memory as a new second-field signal at a third timing; and b. a color signal processing unit including means for storing the first-field signal in a second field memory at the first timing, means for outputting a sum and a difference of the signal stored in the second field memory and the second-field signal as new first-field signals at the second timing, means for storing a sum of the signal stored in the second field memory and a signal obtained by delaying the second-field signal by one horizontal scanning period in the second field memory, and storing a difference between these signals in a third field memory, at the 10 second timing, and means for outputting the sum and difference stored in the second and third field memories as new second-field signals.

With the above arrangement (1), an output equivalent to that obtained by mixing and reading out two vertically adjacent pixels in a field read operation can be obtained by a frame read operation.

In order to achieve the above object, according to still another aspect of the present invention, an image pickup apparatus is arranged as in item (2) below.

(2) An image pickup apparatus for performing a frame read operation by interlaced scanning an image pickup element comprising color filters, comprises the following constituting elements a and b:

a. a luminance signal processing unit including means for storing a first-field signal in a first field memory at a first timing, means for outputting a sum of the signal stored in the first field memory and a second-field signal as a new first-field signal at a second timing, means for storing a sum of the signal stored in the first field memory and a signal obtained by delaying the second-field signal by one horizontal scanning period in the first field memory at the second timing, and means for outputting the sum stored in the first field memory as a new second-field signal at a third timing; and b. a color signal processing unit including means for storing the first-field signal in a second field memory at the first timing, means for outputting the signal stored in the second field memory and the second-field signal as new first-field signals at the second timing, means for storing the signal stored in the second field memory at the first timing again in the second field memory at the second timing, means for storing a signal obtained by delaying the second-field signal by one horizontal scanning period in a third field memory at the second timing, and means for outputting the signal stored in the second field memory and the signal stored in the third field memory as new second-field signals at a third timing.

With the above arrangement (2), even when the color filters are aligned in a mosaic pattern, an interlaced read operation is performed by a frame read operation (frame storage mode), thus reproducing a frame image.

BRIEF DESCRIPTION OF THE DRAWINGS

FIGS. 1A and 1B show color filters of conventional image pickup elements;

FIG. 2 shows color filters of another conventional image pickup element;

FIGS. 11A to 11D are views for explaining other embodiments of a read/write operation of a memory;

FIGS. 13A and 13B show other color filter alignments;

Figure 16:
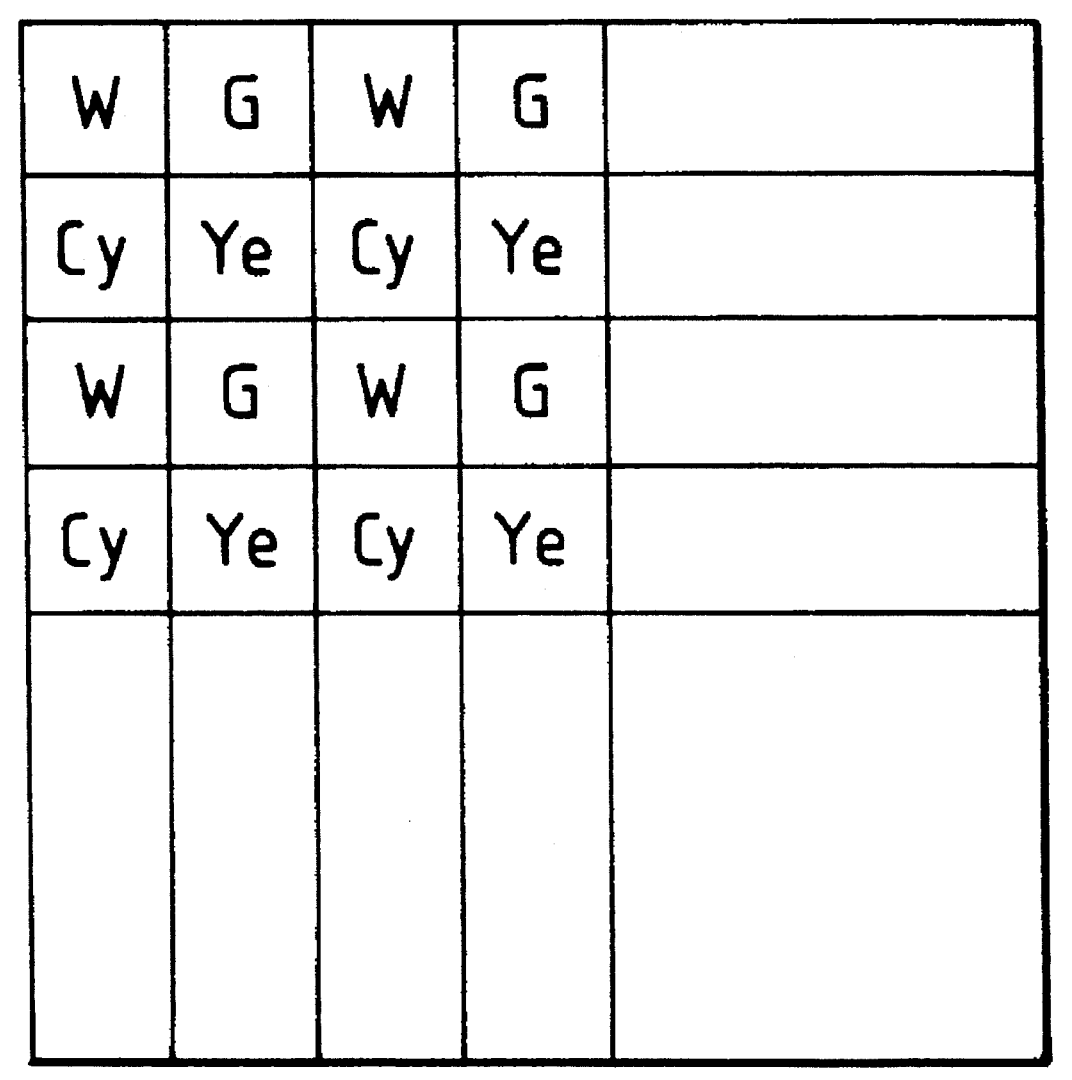

FIG. 16 shows still another color filter alignment; and

DETAILED DESCRIPTION OF THE PREFERRED EMBODIMENTS

[First Embodiment]

Figure 3:
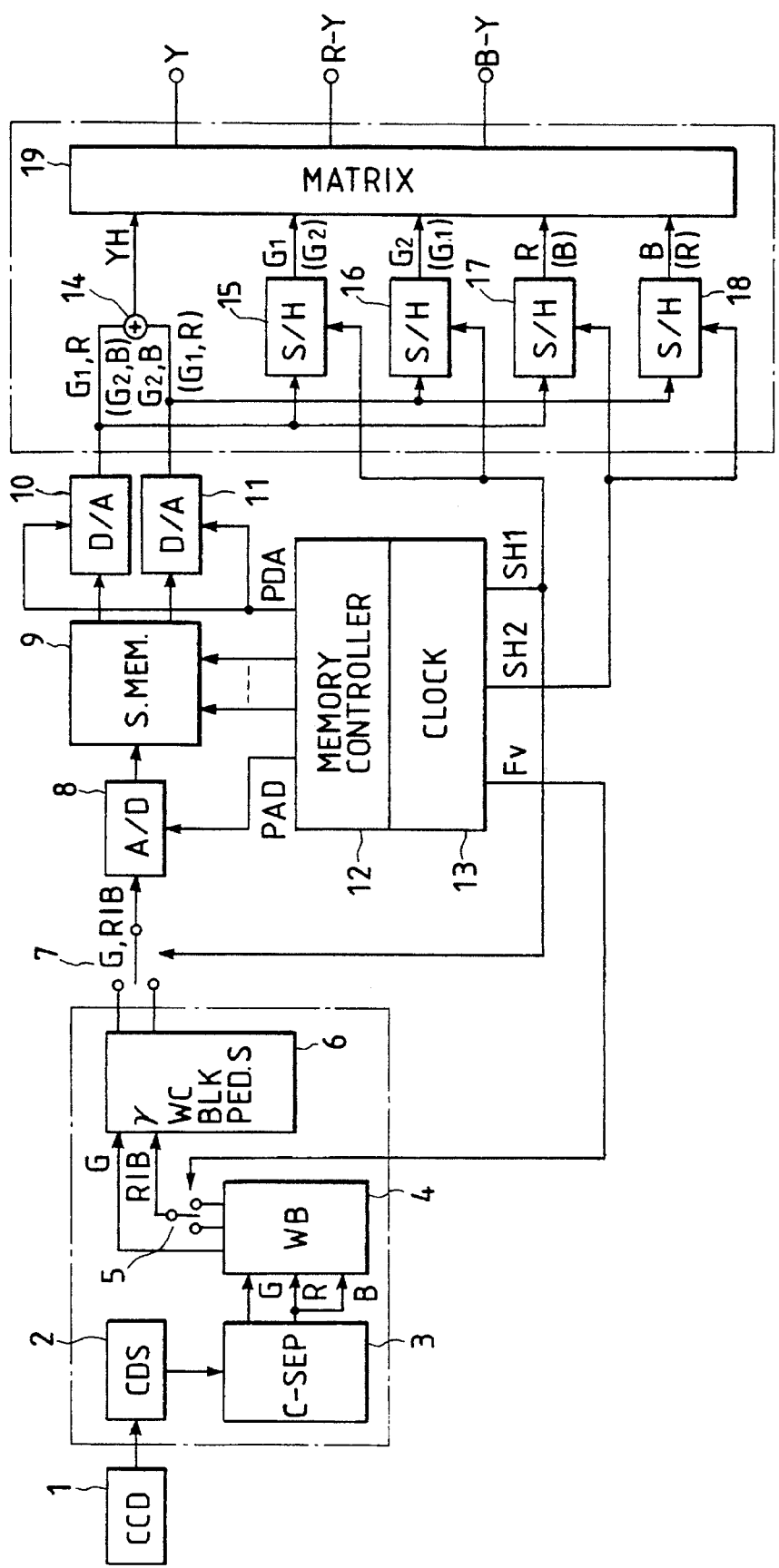
FIG. 3 is a block diagram showing the first embodiment of the present invention.

FIG. 3 is a block diagram showing the first embodiment of the present invention. An apparatus of the first embodiment comprises a solid-state image pickup element (CCD) 1, a correlated double sampling circuit (CDS) 2, a C-SEP circuit 3 for performing color separation, a WB block 4 for adjusting a white balance of color-separated signals, switches 5 and 7 for respectively selecting one of two outputs, a signal processing block 6 for performing gamma processing, white clipping processing, blanking processing, and pedestal level setting processing, an analog-to-digital converter (A/D) 8, a serial memory block 9, digital-to-analog converters (D/As) 10 and 11, a memory controller 12 for controlling the A/D, the serial memory block, and the D/As, a clock generator 13 for generating various pulses, an adder 14, sample & hold circuits 15, 16, 17, and 18, and a matrix circuit 19 for generating a luminance (Y) signal and color difference (R–Y, B–Y) signals based on the outputs from the circuit elements 14 to 18.

Figure 4A:
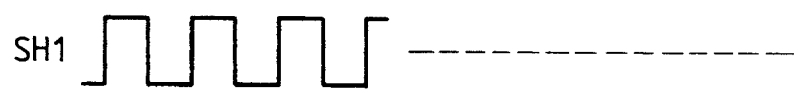
FIG. 4A shows a color filter alignment in the first embodiment.
Figure 4A:
Figure 4B:
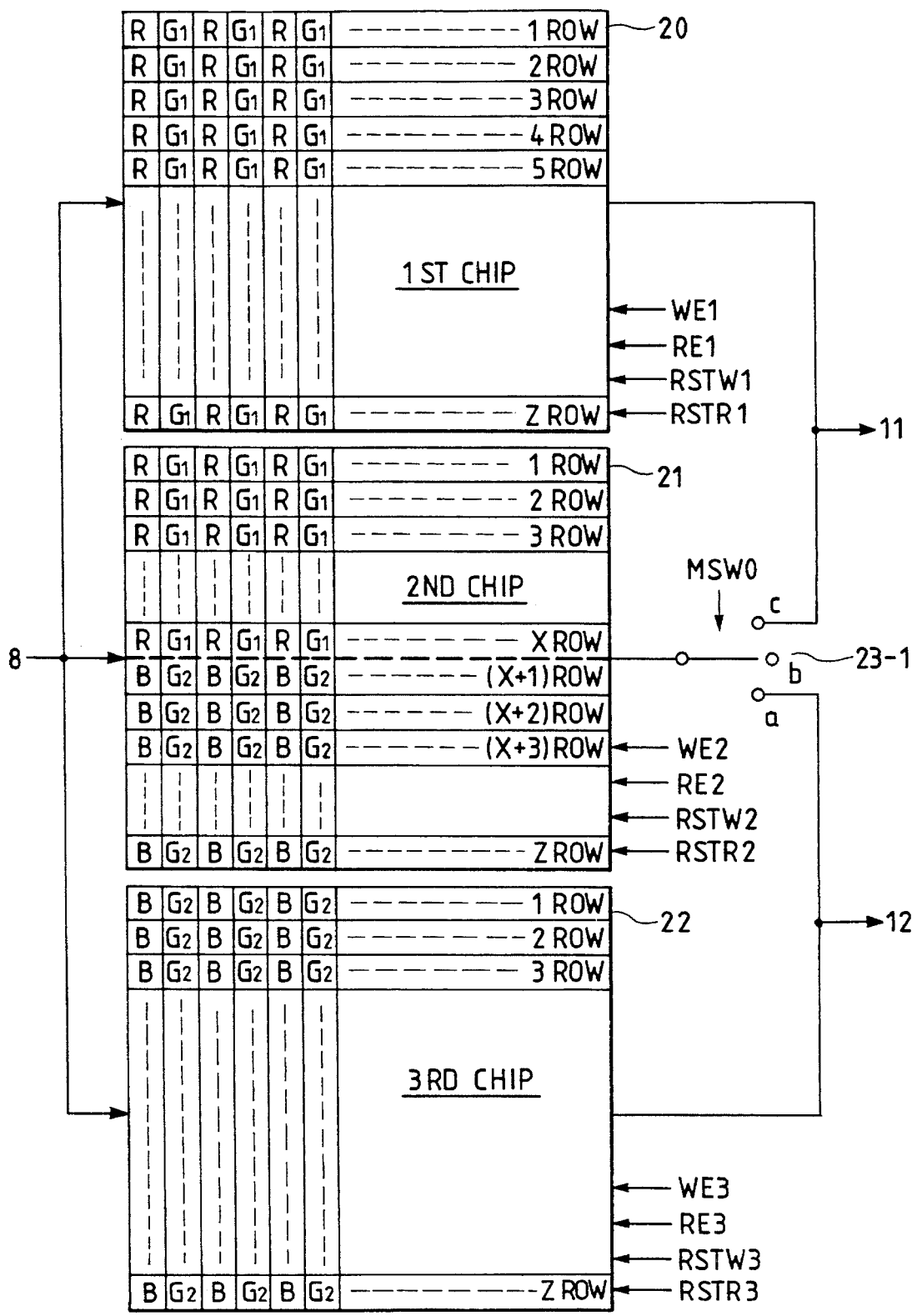
FIG. 4B is a view for explaining a read/write operation of a memory in the first embodiment.
Figure 5A:
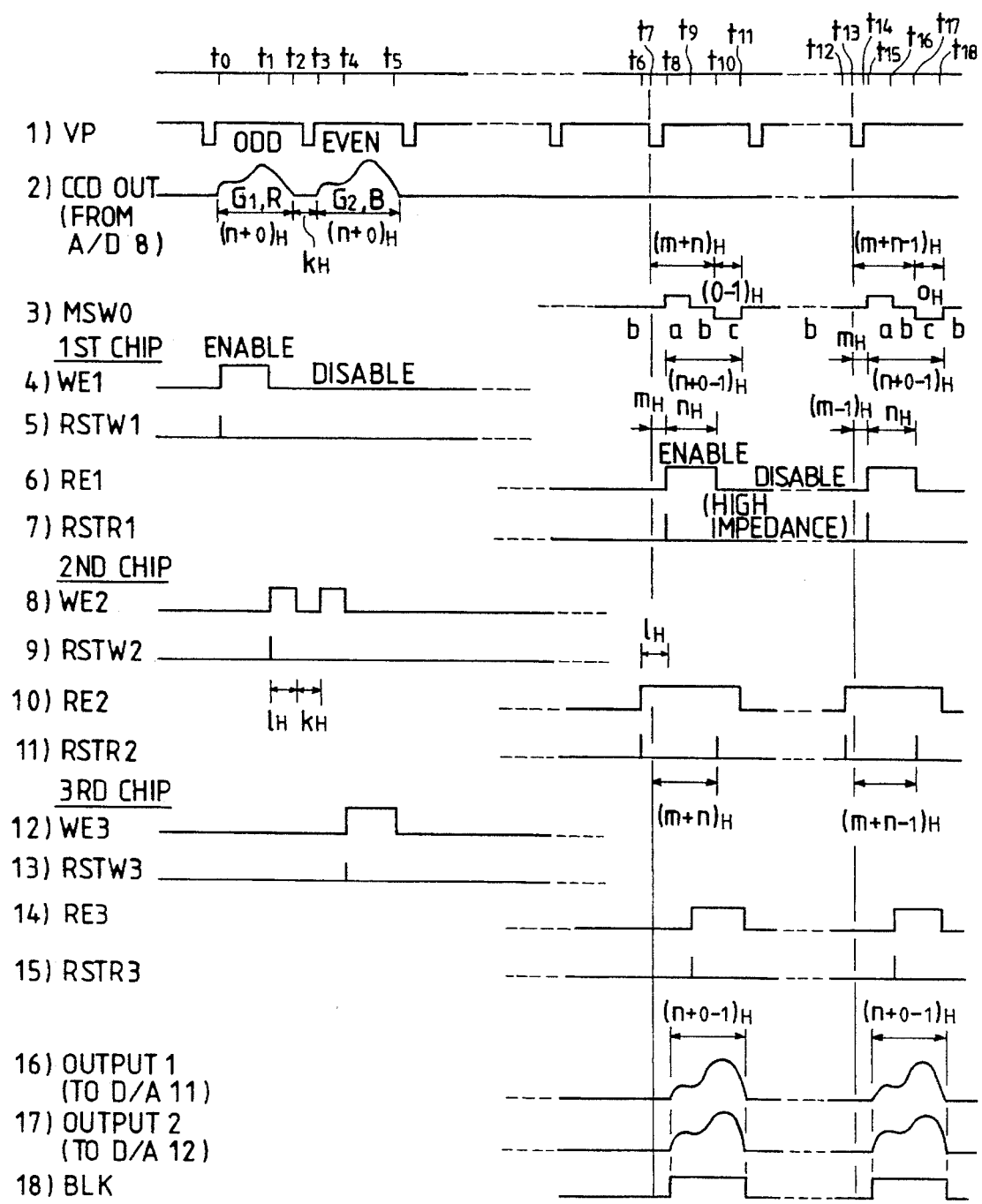
FIG. 5A is a timing chart of the circuit shown in FIG. 3.

FIG. 4A shows a color filter alignment of the CCD 1, FIG. 4B shows an arrangement of the serial memory block 9, and FIG. 5A is a timing chart of memory control timings.

The operation of the present invention will be described below with reference to FIGS. 3, 4A, 4B, and 5A.

A video signal output from the CCD 1 shown in FIG. 3 is input to the CDS block 2 to be subjected to low-frequency noise reduction, and a signal output from the CDS block 2 is input to the C-SEP block 3. The C-SEP block 3 separates the CCD video output into three primary color signals R, G, and B, and the WB block 4 adjusts white balances of these signals.

In this case, since the CCD 1 has a color filter alignment shown in FIG. 4A, it can provide only R and G signals in an odd field and only B and G signals in an even field. Therefore, a B signal output from the WB block 4 in an odd field and an R signal output from the WB block 4 in an even field are false data, and cannot be used. Thus, the switch 5 selects the R signal in an odd field, and the B signal in an even field. A switching pulse Fv for signal selection is generated by the clock generator 13. A signal in which R and B signals alternately appear every 1 V periods after selection will be referred to as an R|B signal hereinafter. The symbol "|" will represent a frame 10 sequential mode hereinafter.

The selected signal is supplied to the signal processing block 6 together with the other output G of the WB block 4, and these signals are subjected to gamma processing, white clipping processing, blanking processing, and pedestal level setting processing.

The outputs G and R|B of the signal processing block 6 are switched by the switch 7 in response to an SH1 pulse in units of pixels, thus obtaining a signal G1,R|G2,B (to be simply referred to as G,R'B hereinafter) corresponding to the CCD color filter alignment again. Note that "," represents a dot sequential signal. The SH1 pulse is generated by the clock generator 13.

The dot sequential signal G,R|B output from the switch 7 is converted into a digital signal by the A/D 8, and the digital signal is input to the serial memory block (S.MEM) 9. Two outputs of the serial memory block 9 are converted into analog signals by the D/As 10 and 11. In this case, clocks PAD and PDA for the A/D and D/As, and a control pulse for the memory are sent from the memory controller 12.

The operation of the serial memory block 9 will be described in more detail below with reference to FIGS. 4B and 5A. In FIG. 4B, the serial memory block 9 comprises serial memories 20 to 22 (in this embodiment, a memory capacity capable of storing all pixel data of the CCD is defined by three chips), and a switch 23-1 for switching the memory chip outputs and outputting the selected output to the D/As 10 and 11. As indicated by 2) in FIG. 5A, since the CCD output begins to be input from the A/D 8 at $t_0$, a write enable signal WE1 is set at high level to enable the memory 20 so that the CCD output is stored in the 1st chip (20) of the serial memory block 9, and a write address of the memory is reset by a write reset signal RSTW1 to start writing data from an address "0" (left end of the 1st row of the memory 20 in FIG. 4B). As a result, (G,R) signals of the CCD output (odd field) indicated by 2) in FIG. 5A are stored on the 1st chip, as shown in FIG. 4B. Subsequently, when the storage capacity of the 1st chip becomes full at $t_1$, the signal WE1 goes to low level, and the 1st chip 20 is disabled.

The 2nd chip (21) of the serial memory block 9 is enabled by a write enable signal WE2 indicated by 8) in FIG. 5A, and output signals in the odd field of the CCD output after $t_1$ are stored from an address "0" in response to a pulse RSTW2 indicated by 9) in FIG. 5A, as shown in FIG. 4B.

Subsequently, the signal WE2 is set at low level during a blanking interval $K_H$ from $t_2$ corresponding to the end timing of a video interval of the odd field to $t_3$ corresponding to the start timing of the even field, and an address at the timing $t_2$ is held, thus inhibiting memory write access. If the memories 20, 21, and 22 comprise serial dynamic memories and the interval $K_H$ is longer than a predetermined time $K_0$, a reset operation may be required. Therefore, the blanking interval $K_H$ of the CCD video output is set to fall within a time range in which data can be held while holding the address ($K_H > K_0$).

In this manner, even when the interval $K_H$ is set regardless of a V blanking interval of a television rate and memory write access is performed, no problem is posed as long as the interval $K_H$ is adjusted to a regular V blanking interval in a read mode.

When the video interval of the even field starts at $t_3$, the signal WE2 indicated by 4) in FIG. 5A is set at high level again, and data of signals ($G_2$,B) are written until $t_4$, i.e., until the 2nd chip 21 is full of data. At $t_4$, the signal WE2 is set at low level to disable the memory 21. A write enable signal WE3 indicated by 12) in FIG. 5A is set at high level and a pulse RSTW3 indicated by 13) in FIG. 5A is generated, so that even-field video signals after $t_4$ are sequentially written in the 3rd chip 22.

Simultaneously with the end of the even-field video signal at $t_5$, the 3rd chip is disabled by the signal WE3, thus ending the write operation.

A read operation from the serial memory block 9 will be described below. The switch 23-1 is connected to a terminal b to be set in an open state. At $t_6$, a read enable signal RE2 indicated by 10) in FIG. 5A is set at high level, and a read reset pulse RSTR2 indicated by 11) in FIG. 5A is generated, thus starting read access to the 2nd chip 21.

In this case, the switch 23-1 is in an open state, signals RE1 and RE3 are at low level, and the outputs of the memories 20 and 22 are in a high-impedance state. Thus, no signals are output to the D/As 10 and 11.

At $t_8$, the signal RE1 is set at high level, and a pulse RSTR1 is output, so that the data are read out from the 1st chip 20 and are output to the D/A 10. At the same time, the switch 23-1 is connected to a terminal a, and the outputs from the 2nd chip are read out to the D/A 11. In this case, since the address of the 2nd chip 21 is advanced by $1_H$, addresses for data stored during an interval between $t_1$ and $t_2$ of the signal WE2 indicated by 8) in FIG. 5A (1st to Xth rows) have already been incremented. Therefore, since the addresses indicate a ($G_2$,B) data start point, i.e., an (X+1)th row of the 2nd chip 21 in FIG. 4B, ($G_2$,B) signals are output to the D/A 11.

At $t_9$, the switch 23-1 is connected to the terminal b to be set in an open state. At the same time, the signal RE3 is set at high level and an RSTR3 pulse is output, thus starting data read access to the 3rd chip 22. As a result, ($G_2$,B) data output from the 3rd chip 22 are sequentially supplied to the D/A 11. At $t_{10}$, the switch 23-1 is connected to a terminal c, and the RSTR2 pulse is output again, so that signals from an address "0" are output to the D/A 10. At $t_{11}$, the video interval for the first field is ended, the switch 23-1 is connected to the terminal b, and the signals RE2 and RE3 are set at low level to disable all the memories.

A read operation of the second field is then started. At $t_{12}$, the signal RE2 is set at high level and the RSTR2 pulse is output, as in the first field. In this case, the switch 23-1 is kept connected to the terminal b. Therefore, no signals are output to the D/As 10 and 11. At $t_{14}$, the signal RE1 is set at high level and the RSTR1 pulse is output. At $t_{15}$, i.e., $1_H$ later, the switch 23-1 is connected to the terminal a.

As a result, from $t_{14}$, outputs ($G_1$,B) starting from the address "0" of the 1st chip 20 are output to the D/A 10, and data ($G_2$,B) from the 2nd chip 21 are output to the D/A 11 from $t_{15}$. In this case, the second-field signals are delayed by $1_H$ and then read out to be interlaced with the first-field signals. In other words, as outputs to the D/A 10, signals from the 2nd row of the 1st chip 20 are valid, and as outputs to the D/A 11, signals from the (X+1)th row of the 2nd chip are valid. For this reason, as shown in FIG. 5A, if a duration of an interval between $t_7$ and $t_8$ is represented by $m_H$, a duration of an interval between $t_{13}$ and $t_{14}$ is given by $(m-1)_H$.

When the read operation of the last, Zth row is completed at $t_{16}$, the switch 23-1 is connected to the terminal b, the signal RE3 is set at high level, and the RSTR3 pulse is output, thus switching outputs to the D/A 11 to the 1st row of the 3rd chip 22. Furthermore, the switch 23-1 is connected to the terminal c at $t_{17}$ to switch the outputs to the D/A 10 to the 2nd chip 21 side. At the same time, the RSTR2 pulse is output, thus reading out data from the 1st row of the 2nd chip 21. In this case, an enable interval of the signal RE1 is $n_H$, and is the same as that in the first field. For this reason, data will not be lost at a boundary since the outputs are switched to the 2nd chip after all the data are read out from the 1st chip 20.

An interval between $t_{13}$ and $t_{17}$ starting from the leading edge of a signal VP is (m+n−1)H, and is shorter by $1_H$ than an interval between $t_7$ and $t_{10}$ in the first field.

Thereafter, a data output operation is continued until $t_{18}$. At $t_{18}$, the switch 23-1 is connected to the terminal b to be set in an open state. At the same time, the signals RE2 and RE3 are set at low level to set the 2nd and 3rd chips 21 and 22 in a high-impedance state, thus ending the video signal output operation.

In the second field, ($G_2$,B) data are read out from $t_{15}$, while ($G_1$,R) data are read out from $t_{14}$. Therefore, read times of these data are shifted by $1_H$. When the ($G_2$,B) data in the last row are read out, since there are no ($G_1$,R) data, false signals are undesirably read out.

Therefore, a read time of ($G_1$,R) and ($G_2$,B) data in the second field is shorter by $1_H$ than a video interval of valid pixels. At the same time, since a difference between video intervals of the first and second fields causes a partial flicker in the last row (Zth row), output signal intervals of ($G_1$,R) and ($G_2$,B) are also shortened by $1_H$ in the first field. More specifically, if a duration of an interval between $t_{17}$ and $t_{18}$ is represented by $o_H$, a duration of an interval between $t_{10}$ and $t_{11}$ is given by $(o-1)_H$, and intervals between $t_7$ and $t_{11}$ and between $t_{13}$ and $t_{18}$ from the trailing edge of the signal VP are equal to $(m+n+o-1)_H$ in both the first and second fields.

Figure 4C:
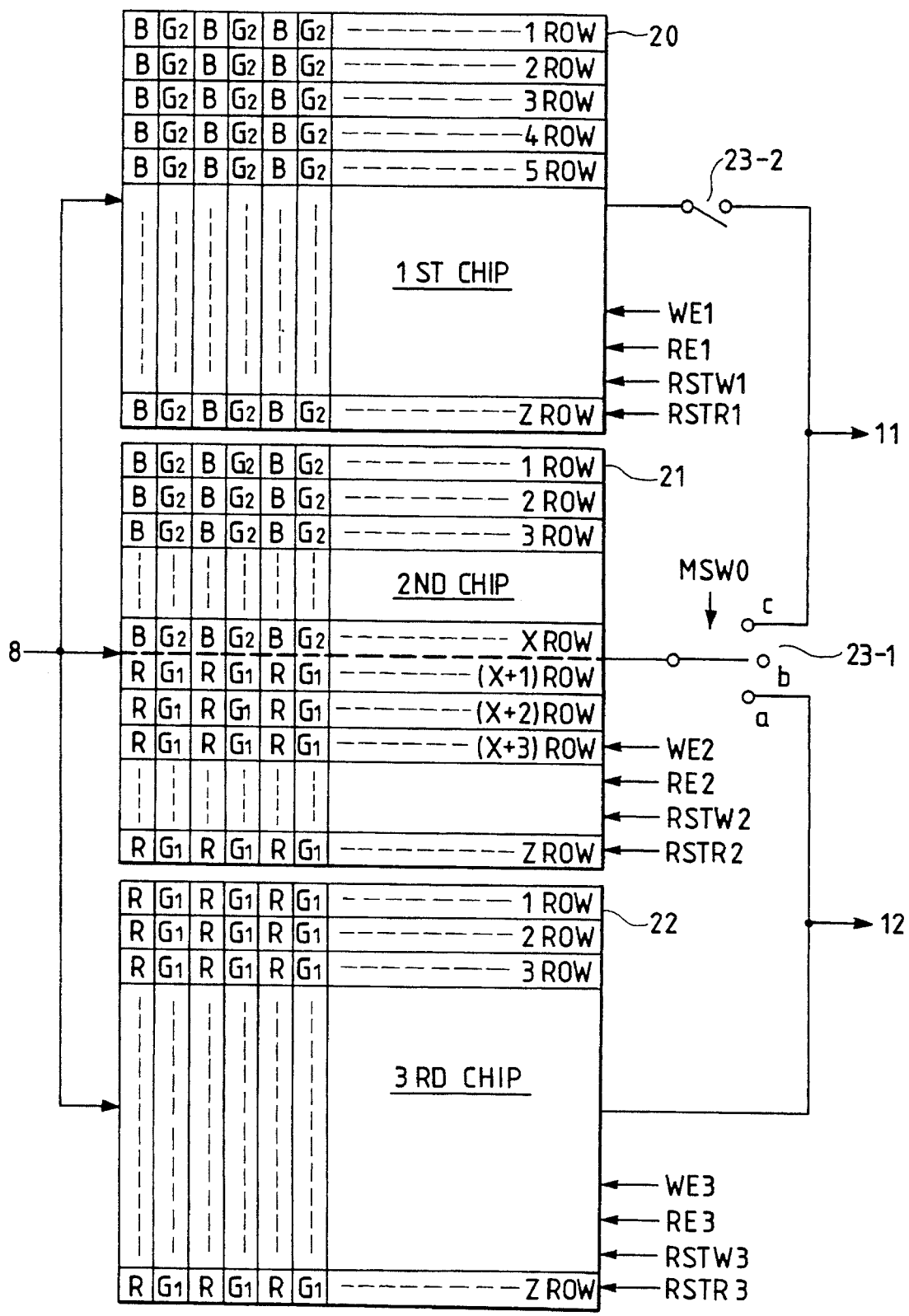
FIG. 4C is a view for explaining the second embodiment of a read/write operation of a memory.

Since the read time of the 1st chip 20 in the first field is earlier by 1H and false signals are generated, the 1st chip 20 outputs may be removed during an interval between $t_{10}$ and $t_{15}$ by setting a switch 23-2 in FIG. 4C in an open state. Similarly, in order to remove false data and to prevent a flicker, signals other than those in an interval $(n+o-1)_H$ may be muted by a blanking pulse indicated by 18) in FIG. 5A during intervals between $t_8$ to $t_{11}$ and between $t_{15}$ to $t_{18}$. Alternatively, the Zth row of the 3rd chip may be successively read out twice instead of removing false data, so that data in the first field of the 2nd and 3rd chips and data in the second field of the 2nd chip may be read out up to the last row.

On the other hand, write end and read start timings, and first-field read end and second-field read start timings may be arbitrarily set in correspondence with specifications of serial memories to be used or those of a video equipment to which the present invention is applied, and an interval between adjacent timings can be minimized to attain a high-speed photographing operation. Furthermore, switching operations of the switches 23-1 and 23-2 are performed within an H blanking interval of video signals, thus suppressing unnecessary noise components.

16) and 17) in FIG. 5A represent output timings (outputs to the D/As 10 and 11) in this embodiment. The digital signals supplied to the D/As 10 and 11 are converted into analog signals ($G_1$,R) and ($G_2$,B), and these analog signals are supplied to an analog signal processing circuit.

The adder 14 adds the signals ($G_1$,R) and ($G_2$,B) to output a luminance signal YH having a high-frequency component. The sample & hold circuits 15 and 16 sample and hold the signals ($G_1$,R) and ($G_2$,B) in response to the SH1 pulse to output $G_1$ and $G_2$ signals. The sample & hold circuits 17 and 18 sample and hold the signals ($G_1$,R) and ($G_2$,B) in response to the SH2 pulse to output R and B signals. The output signals from the sample & hold circuits 15 to 18 are supplied to the matrix circuit 19.

Figure 6:
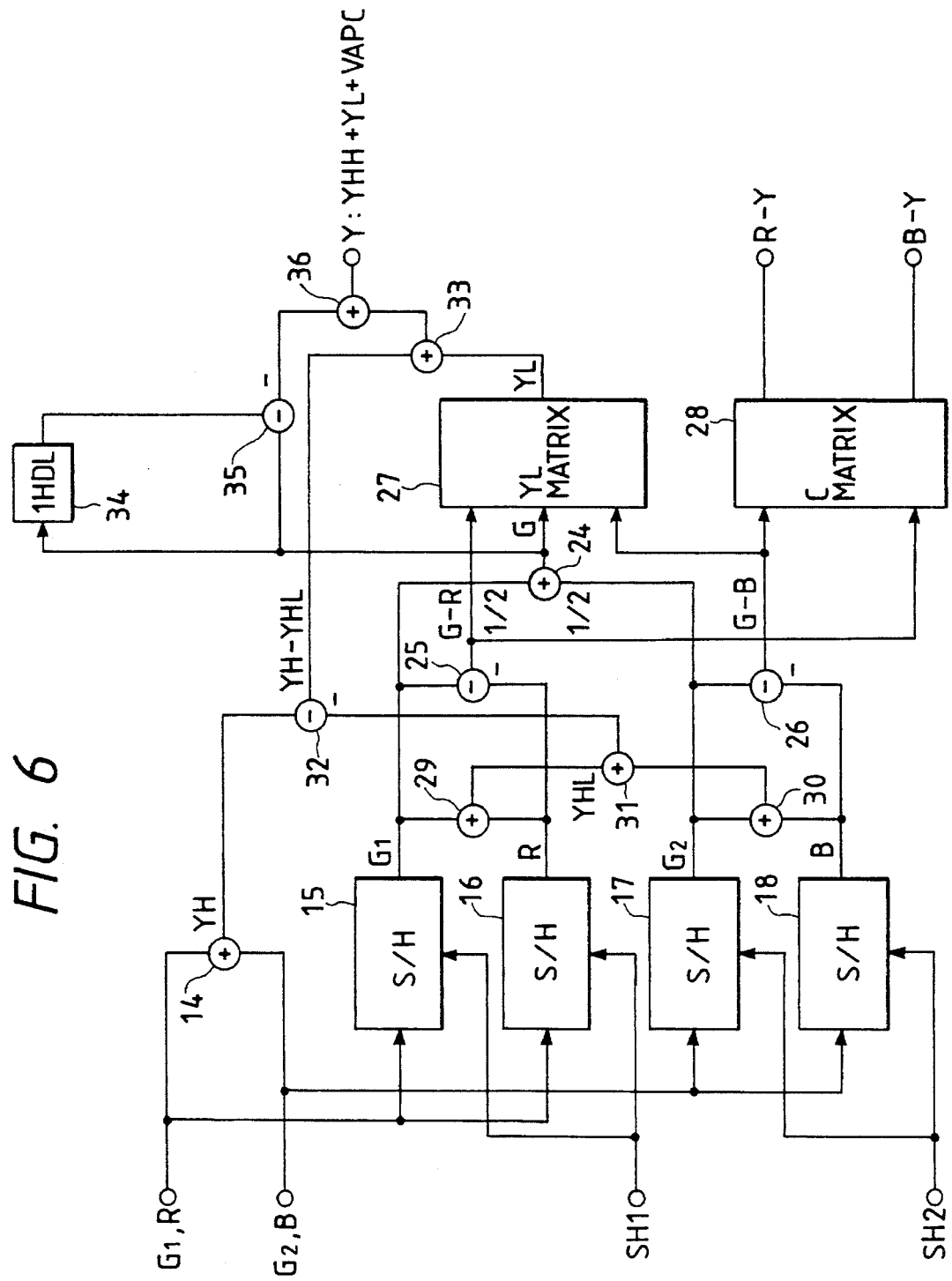
FIG. 6 is a circuit diagram of a matrix circuit shown in FIG. 3.

As shown in FIG. 6, in the matrix circuit 19, an adder 24 averages the $G_1$ and $G_2$ signals to output a G signal, and subtracters 25 and 26 calculate differences between $G_1$ and R and between $G_2$ and B to output G–R and G–B signals. The G–R, G, and G–B signals are supplied to a YL MATRIX 27 to output a low-frequency luminance signal YL. The G–R and G–B signals are supplied to a C MATRIX 28 to output color difference signals R–Y and B–Y.

Adders 29 and 30 add $G_1$ and R, and $G_2$ and B, respectively, and another adder 31 adds the outputs from the adders 29 and 30 to output a low-frequency component YHL of the output YH of the adder 14. A subtracter 32 calculates a difference YH–YHL between the outputs YH and YHL.

The output G from the adder 24 is delayed by $1_H$ by a 1H delay line, and a subtracter 35 calculates a difference between the delayed signal and G, i.e., VAPC representing a vertical high-frequency component.

An adder 33 adds YL and YH–YHL, and an adder 36 10 adds the sum from the adder 33 and VAPC, thus obtaining a luminance signal Y:YHH+YL+VAPC. According to the embodiment described above, memory control can be simplified since the serial memory block 9 is used, and the memory controller 12 can be easily designed.

When high-speed FIFO serial memories capable of a high-speed asynchronous read/write operation are employed, a read operation ($t_6$ in the 2nd chip) is started during a write operation of the memory (interval between $t_1$ and $t_4$ in the 2nd chip), thus increasing the operating speed of the system.

[Second Embodiment]

Figure 5B:
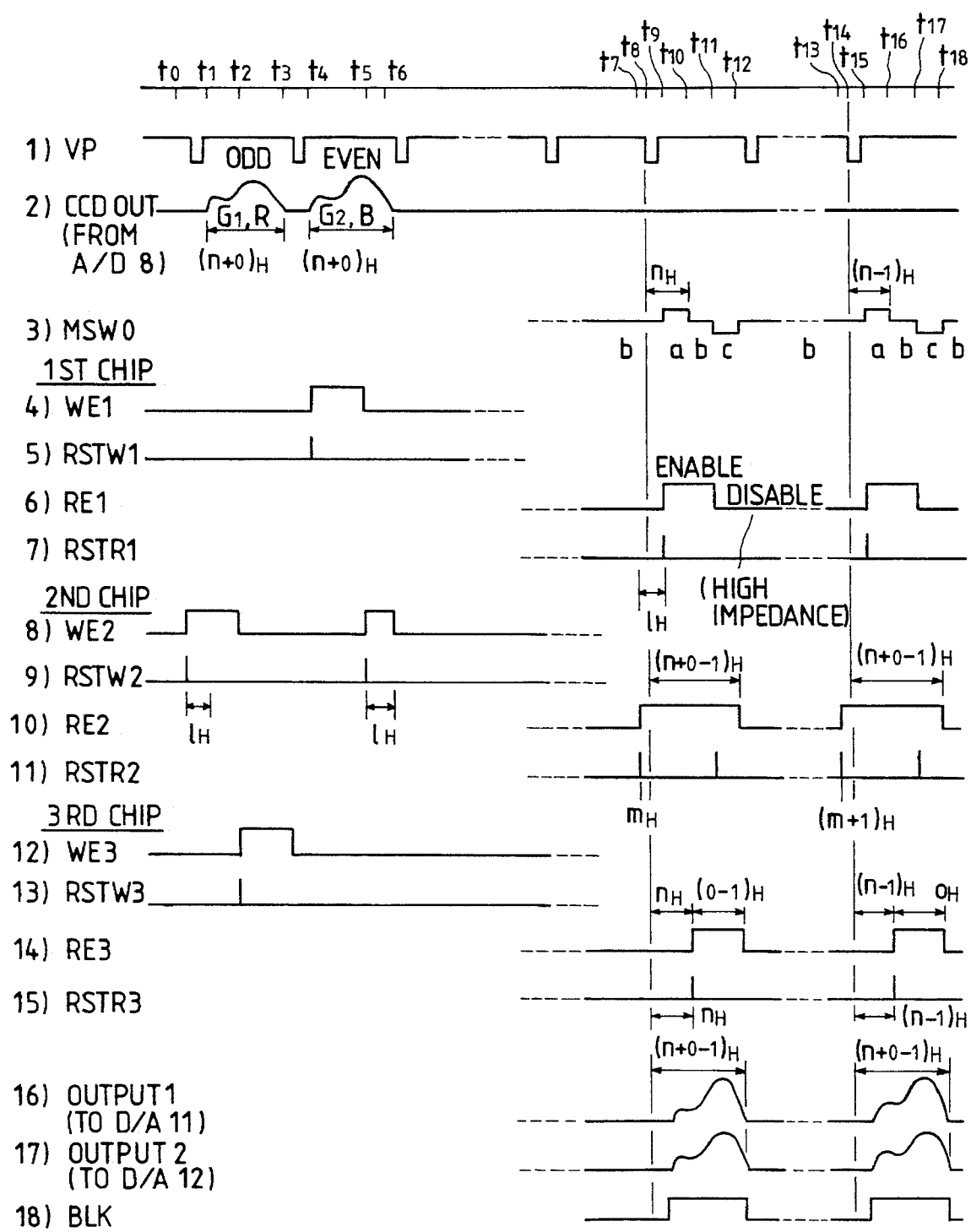
FIG. 5B is another timing chart of the circuit shown in FIG. 3.

In the second embodiment, a memory write method is executed for the arrangement of the first embodiment, as shown in FIGS. 4C and 5B.

Therefore, the block arrangement of the second embodiment is the same as that of the first embodiment. In this embodiment, signals in parentheses are output as the flow of signals after the memories.

This embodiment will be described below with reference to FIGS. 4C and 5B. Since a CCD output begins to be input from the A/D 8 from $t_1$, as indicated by 2) in FIG. 5B, a write enable signal WE2 indicated by 8) in FIG. 5B is set at high level from $t_0$ $1_H$ before $t_1$ to enable the 2nd chip 21 so that the outputs can be stored from the (X+1)th row of the 2nd chip 21, and after the write address of the memory is reset by the write reset signal RSTW2, write access is started from an address "0" (left end of the 1st row in the 2nd chip 21 shown in FIG. 4B) (for 1=X). As a result, ($G_1$,B) signals of the CCD output (odd field) indicated by 2) in FIG. 5B are stored from the (X+1)th row on the 2nd chip shown in FIG. 4C, as shown in FIG. 4C.

Subsequently, when the 2nd chip becomes full of data at $t_2$, the signal WE2 goes to low level to disable the 2nd chip 21. At the same time, the memory 22 is enabled in response to a write enable signal WE3 indicated by 12) in FIG. 5B, and output signals in the CCD odd field after $t_2$ are stored from an address "0" of the 3rd chip 22 in response to an RSTW3 pulse output indicated by 13) in FIG. 5B, as shown in FIG. 4C. The signal WE3 is set at low level from $t_3$ corresponding to the end timing of the odd video interval, thus disabling the 3rd chip 22.

When the video interval of the even field is started at $t_4$, a signal WE1 indicated by 4) in FIG. 5B is set at high level, and data of signals ($G_2$,B) are sequentially written in the 1st chip 20 until $t_5$, i.e., until the chip 20 is full of data. At $t_5$, the signal WE1 is set at low level to disable the chip 20. The signal WE2 indicated 8) in FIG. 5B is set at high level again, and the RSTW2 pulse indicated by 9) in FIG. 5B is generated, so that even-field video signals after $t_5$ are sequentially written from the 1st row to the (X–1)th row of the 2nd chip 21. When the even-field video signals are ended at $t_6$, the 2nd chip is disabled by the signal WE2, thus ending a write operation.

A read operation from the serial memory block 9 will be described below. The switch 23-1 is connected to the terminal b to be set in an open state. At $t_7$, a read enable signal RE2 indicated by 10) in FIG. 5B is set at high level, and a read reset pulse RSTR2 is output as indicated by 11) in FIG. 5B, thus starting a read operation of the 2nd chip 21. In this case, the switch 23-1 is in an open state, signals RE1 and RE2 are at low level, and outputs from the chips 20 and 22 are in a high-impedance state. Therefore, no signals are output to the D/As 10 and 11.

At $t_9$, the signal RE1 is set at high level, and an RSTR1 pulse is output, so that data are read out from the 1st chip 20 and are output to the D/A 10. At the same time, the switch 23-1 is connected to the terminal a, and the outputs are read out to the D/A 11. In this case, since the address of the 2nd chip 21 is advanced by 1H, addresses for data stored during an interval between $t_5$ and $t_6$ of the signal WE2 indicated by 8) in FIG. 5B have already been incremented. Therefore, since the addresses indicate a ($G_1$,R) data start point, i.e., an (X+1)th row, ($G_1$,B) signals are output to the D/A 11.

At $t_{10}$, the switch 23-1 is connected to the terminal b to be set in an open state. At the same time, the signal RE3 is set at high level, and an RSTR3 pulse is output, thus starting a data read operation of the 3rd chip 22. As a result, ($G_1$,R) data output from the chip 22 are output to the D/A 11. At $t_{11}$, the switch 23-1 is connected to the terminal c, and at the same time, the RSTR2 pulse is output again, so that signals from an address "0" of the 2nd chip are output to the D/A 10. At $t_{12}$, the video interval of the first field is ended, the switch 23-1 is connected to the terminal b, and the signals RE2 and RE3 are set at low level to disable all the memories. A read operation of the second field is then started. At $t_{13}$, the signal RE2 is set at high level, and the RSTR2 pulse is output like in the first field. In this case, the switch 23-1 is kept connected to the terminal b. Therefore, no signals are output to the D/As 10 and 11.

At $t_{15}$, the switch 23-1 is connected to the terminal a, the signal RE1 is set at high level, and the RSTR1 pulse is output. As a result, outputs ($G_2$,B) from the 1st chip 20 are output from an address "0" to the D/A 10, and ($G_1$,R) outputs from the 2nd chip are output to the D/A 11.

In the second field, however, signals must be read out to be delayed by $1_H$ so as to be interlaced with first-field signals. More specifically, outputs to the D/A 11 must be read out from the 2nd row, i.e., (X+2)th row of ($G_1$,R) data. For this reason, if a duration of an interval between $t_7$ and $t_8$ is represented by $m_H$, a duration of an interval between $t_{13}$ and $t_{14}$ is given by (m+1)H. When intervals between $t_8$ and $t_9$ and between $t_{14}$ and $t_{15}$ are set to have the same duration, the address of the 2nd chip 21 is set at the left end of the 2nd row, i.e., (X+2)th row of ($G_1$,R) data at the timing $t_{15}$.

At $t_{16}$, the switch 23-1 is connected to the terminal b, the signal RE3 is set at high level, and the RSTR3 pulse is output. The timing $t_{16}$ is set so that an interval between $t_{14}$ and $t_{16}$ has a duration of (n−1)H, and this interval is shorter by $1_H$ than an interval between $t_8$ and $t_{10}$. Therefore, both intervals between $t_7$ and $t_{10}$ and between $t_{13}$ and $t_{16}$ are equal to each other, i.e., $(n+m)_H$, and the timing $t_{16}$ just corresponds to an end timing of a read operation of ($G_1$,R) data.

That is, at $t_{16}$, ($G_1$,R) data are sent to the D/A 11 without losing data at a boundary between the 2nd and 3rd chip outputs.

Subsequently, at $t_{17}$, the switch 23-1 is connected to the terminal c, the signal RE1 is set at low level, and the RSTR2 pulse is output again, thus switching the output to the D/A 10 to those from the 1st chip. The data are kept output to the D/A 10 until $t_{18}$. At $t_{18}$, the switch 23-1 is set in an open state, and at the same time, the signals RE2 and RE3 are set at low level, thereby setting the 2nd and 3rd chips 21 and 22 in a high-impedance state. Thus, the video signal output operation is ended.

In the second field, ($G_2$,B) data are read out from the 1st row, while ($G_1$,R) data are read out from the 2nd row. Thus, read times of these data are shifted by $1_H$, and when ($G_2$,B) data in the last row are read out, since there are no ($G_1$,R) data, false signals are undesirably read out. Therefore, read times of ($G_1$,R) and ($G_2$,B) data in the second field are shortened by $1_H$ as compared to the video intervals of valid pixels. At the same time, a difference between video intervals in the first and second fields causes a partial flicker in the last row (Zth row). Therefore, in the first field, read times of ($G_1$,R) and ($G_2$,B) are shortened by $1_H$. That is, if a duration of an interval between $t_{16}$ and $t_{18}$ is represented by $0_H$, intervals between $t_8$ and $t_{12}$ and between $t_{14}$ and $t_{18}$ in both the first and second fields are equal to each other, i.e., $(n+0-1)_H$.

Similarly, in order to remove false data and to prevent a flicker, signals may be muted by a blanking pulse indicated by 18) in FIG. 5B in intervals other than intervals between $t_9$ and $t_{12}$ and between $t_{15}$ and $t_{18}$.

Alternatively, instead of removing false data, the Zth row of the 3rd chip may be successively read out twice to execute approximation processing.

On the other hand, write end and read start timings, and first-field read end and second-field read start timings may be arbitrarily set in correspondence with specifications of serial memories to be used or those of a video equipment to which the present invention is applied, and an interval between adjacent timings can be minimized to attain a high-speed photographing operation. Furthermore, switching operations of the switches 23-1 and 23-2 are performed within an H blanking interval of video signals, thus suppressing unnecessary noise components.

16) and 17) in FIG. 5B represent output timings (outputs to the D/As 10 and 11) in this embodiment.

The digital signals supplied to the D/As 10 and 11 as described above are converted to analog signals ($G_2$,B) and ($G_1$,R), and the analog signals are supplied to the next analog signal processing circuit. The adder 14 adds the signals ($G_1$,R) and ($G_2$,B) to output a luminance signal YH having a high-frequency component. The sample & hold circuits 15 and 16 sample and hold the signals ($G_2$,B) and ($G_1$,R) in response to the SH1 pulse to output $G_2$ and $G_1$ signals. The sample & hold circuits 17 and 18 sample and hold the signals ($G_2$,B) and ($G_1$,R) in response to the SH2 pulse to output B and R signals. These output signals are supplied to the matrix circuit 19. The operation of the matrix circuit is the same as that in the first embodiment.

[Third Embodiment]

Figure 7:
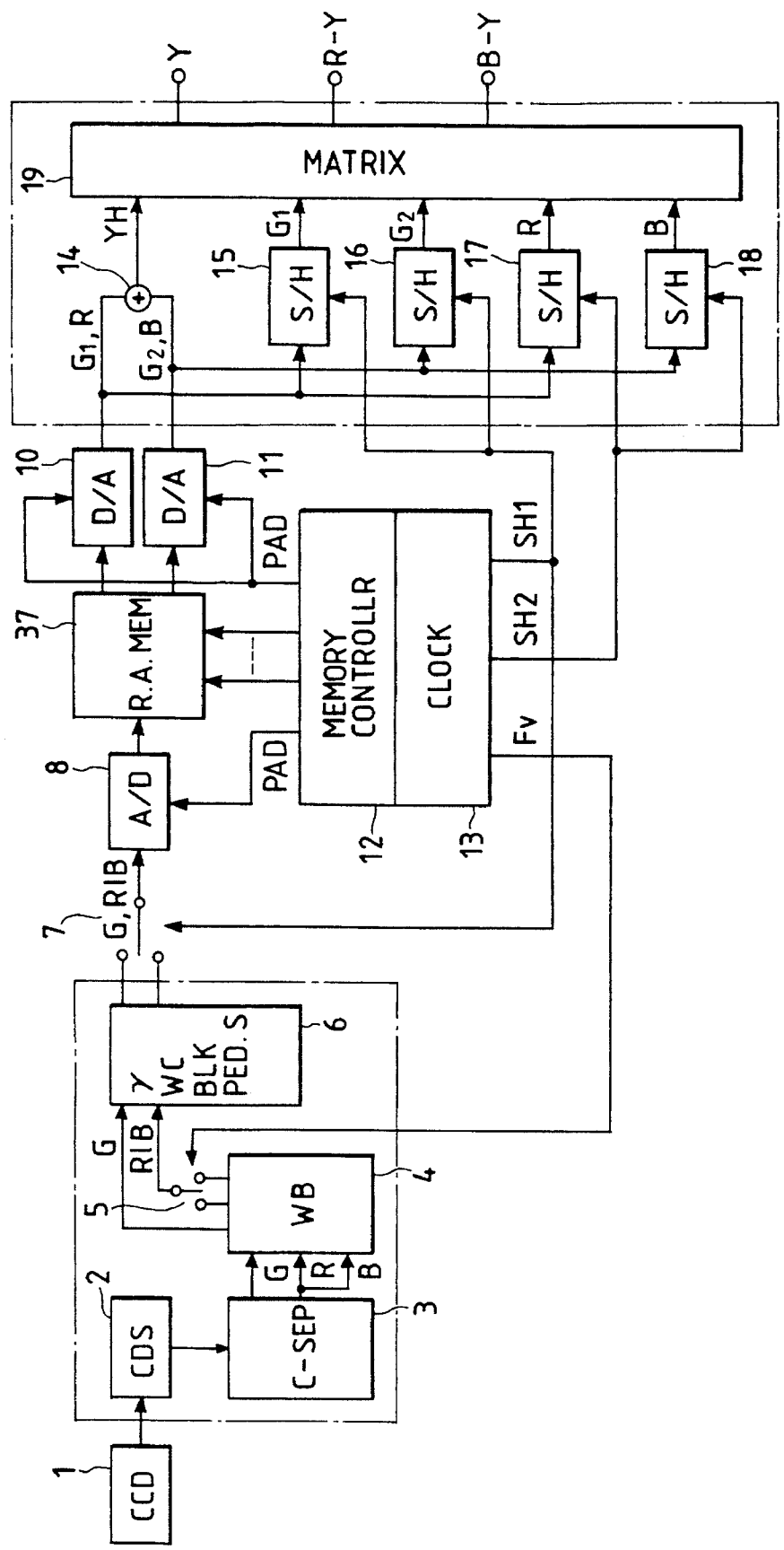
FIG. 7 is a block diagram showing the third embodiment of the present invention.

FIG. 7 is a block diagram showing the third embodiment of the present invention. An apparatus of this embodiment comprises a RAM (random access memory) 37 in addition to the same blocks as the blocks 1 to 8 and 10 to 19 in the first embodiment. The block arrangement of the RAM 37 is the same as that of the serial memory block 9 in the first embodiment, as shown in FIG. 4B. The memory chips 20, 21, and 22 in FIG. 4B comprise RAM chips in this embodiment, and an address input signal, a row address strobe signal, a column address strobe signal, a read/write switch signal, and an output enable signal are used as control signals in place of the signals RE, WE, RSTR, and RSTW.

In this embodiment, data can be randomly written at arbitrary addresses. In a write mode, addresses are designated so that ($G_1$,R) signals are written from the 1st row to the last, Zth row of the 1st chip and from the 1st row to the Xth row of the 2nd chip in an odd field. In an even field, addresses are designated so that (B,G) signals are written from the (X+1)th row to the last, Zth row of the 2nd chip, and from the 1st row to the last, Zth row of the 3rd chip.

In a read mode, the switch 23-1 is switched as indicated by 3) in FIG. 5A, so that data are read out from the 1st row of the 1st chip and the (X+1)th row of the 2nd chip at $t_8$ in FIG. 5A, from the first row of the third chip at $t_9$, and from the 1st row of the 2nd chip at $t_{10}$, and the chip which is not yet subjected to the read operation is set in an output high-impedance state in response to an output enable signal, thereby obtaining the first field. Although the second field is substantially the same as the first field, the read operation of the 1st chip is started from the 2nd row at $t_{14}$ to be interlaced with the first-field signals. In order to remove false data and to prevent a flicker, the read operations are ended at the (Z−1)th row of the 3rd chip for the first and second fields, at the (X−1)th row of the 2nd chip for the first field, and at the Xth row of the 2nd chip for the second field. Alternatively, the Xth row of the 2nd chip for the second field may be read twice. The third embodiment does not require an idle read operation in a read mode unlike in the first embodiment since the RAMs are used.

[Fourth Embodiment]

Figure 8:
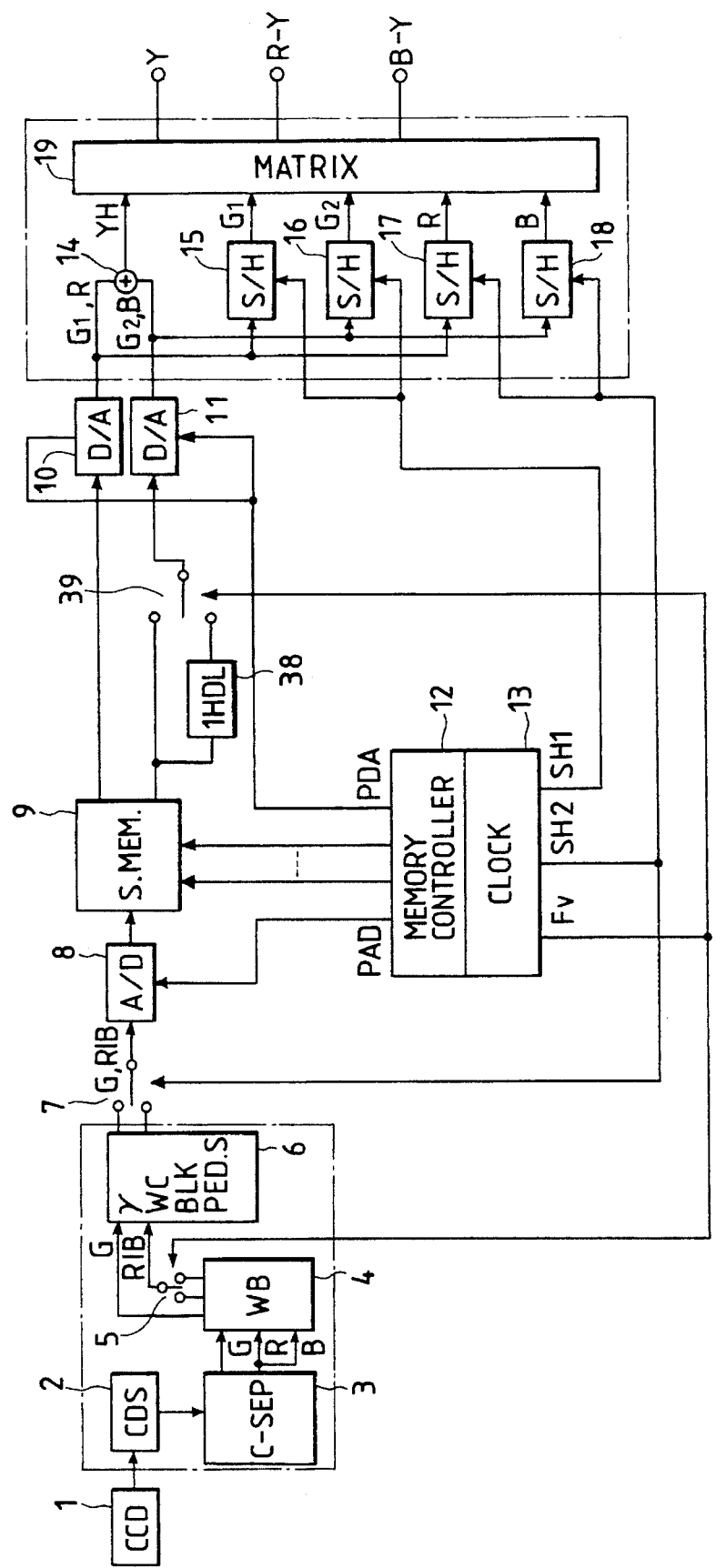
FIG. 8 is a block diagram showing the fourth embodiment of the present invention.

FIG. 8 is a block diagram showing the fourth embodiment of the present invention. In FIG. 8, blocks 1 to 19 are the same as those in the first embodiment. An apparatus of this embodiment also includes a line memory 38 for delaying a signal by $1_H$, and a switch 39 for selecting the output from the serial memory block 9 or the output from the line memory 38. In this embodiment, in a read mode from the memory, the outputs from the memory block 9 are selected in the first field, and the outputs from the line memory 38 are selected in the second field as outputs to the D/A 11, i.e., ($G_2$,B) outputs, thus achieving interlaced scanning. In this embodiment, since the interlaced scanning is achieved by the line memory, as described above, complicated memory control need not be performed unlike in the first embodiment.

[Fifth Embodiment]

Figure 9:
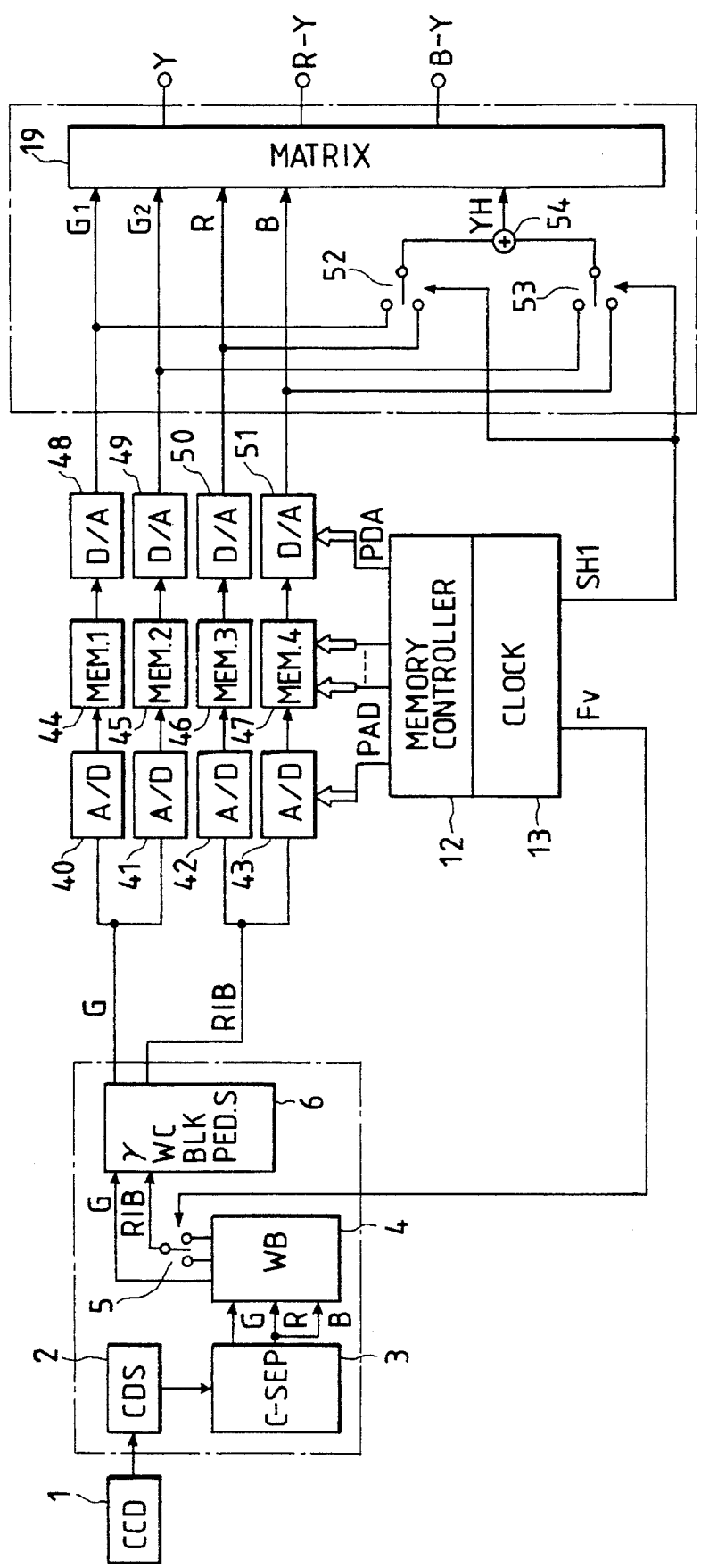
FIG. 9 is a block diagram showing the fifth embodiment of the present invention.

FIG. 9 is a block diagram showing the fifth embodiment of the present invention. In FIG. 9, blocks 1 to 6, 12, 13, and 19 are the same as those in the first embodiment. An apparatus of this embodiment also includes analog-to-digital converters (A/Ds) 40 to 43, memories 44 to 47 such as serial memories or RAMs, digital-to-analog converters (D/As) 48 to 51, switches 52 and 53 for switching signals for two lines in response to an SH1 pulse in units of pixels, and an adder 54.

The operation of this embodiment will be described below. The same operations as in the first embodiment are performed in the blocks 1 to 6. The signal processing block 6 outputs G signals ($G_1$|$G_2$) and R|B signals (R|B). The G signals are supplied to the A/Ds 40 and 41, and the R|B signals are supplied to the A/Ds 42 and 43. Of the G signals, $G_1$ signals output in an odd field are A/D-converted by the A/D 40, and the digital signals are stored in the memory 44. Similarly, the $G_2$, R, and B signals are stored in the memories 45, 46, and 47, respectively.

In a read mode, the data are simultaneously output from the memories to the D/As 48 to 51. In order to attain interlaced scanning, in the first field, data in the 1st row to the (Z−1)th row immediately before the last row in the respective memories are read out, and in the second field, data in the 1st to the (Z−1)th row immediately before the last row in the MEM1 and MEM3, and in the 2nd row to the last row in the MEM2 and MEM4 are read out.

[Sixth Embodiment]

Figure 10:
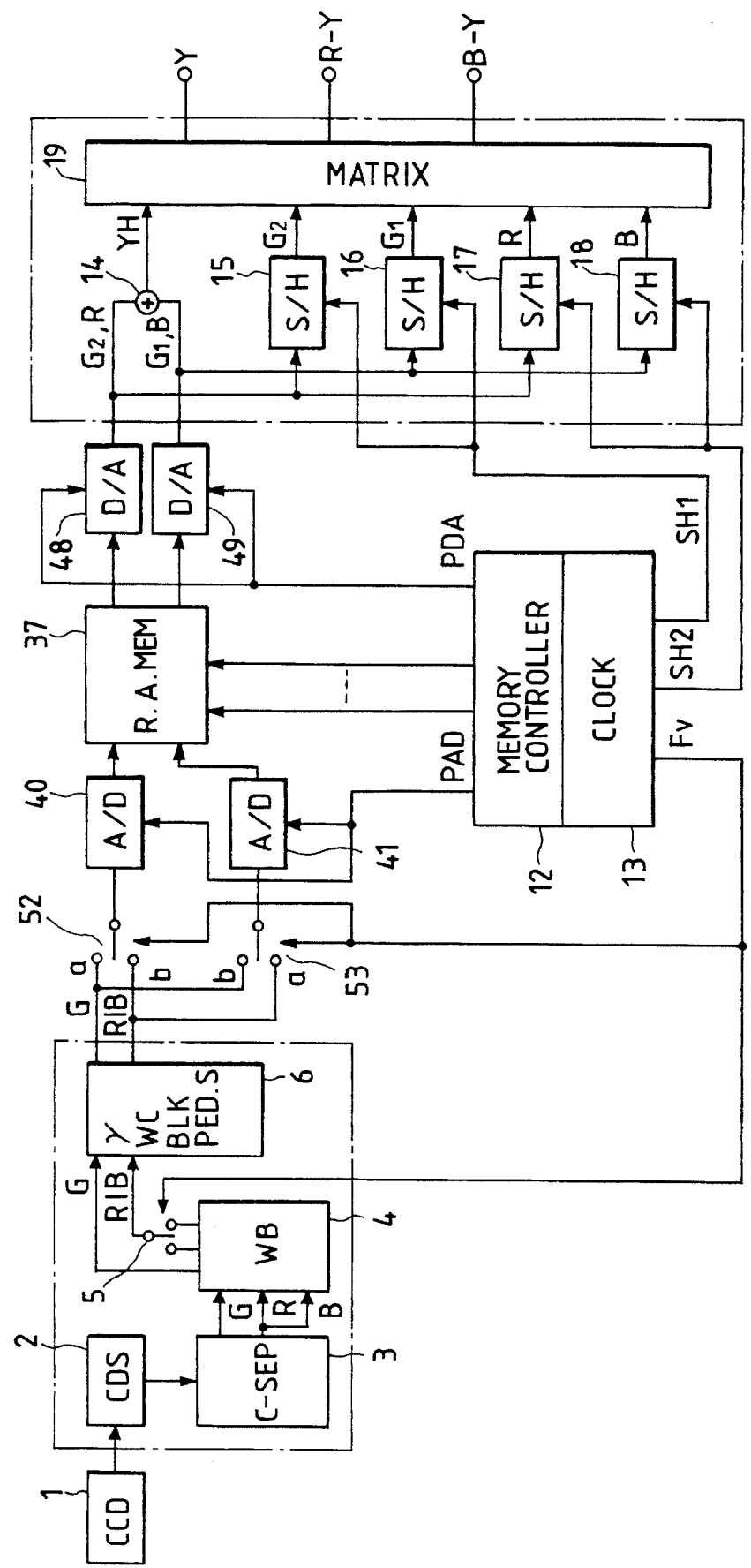
FIG. 10 is a block diagram showing the sixth embodiment of the present invention.

FIG. 10 is a block diagram showing the sixth embodiment of the present invention. Blocks 1 to 6, 12 to 19, and 37 in this embodiment are the same as those in the second embodiment, and blocks 40, 41, 48, and 49 are the same as those in the fourth embodiment. In addition, switches 52 and 53 are used to switch two signals in units of fields. In this embodiment, outputs G ($G_1$|$G_2$) and R|B from the signal processing block 6 are switched for each 1V in response to a signal Fv, and are stored in the RAM block 37 via the A/Ds 40 and 41.

Figure 11B:
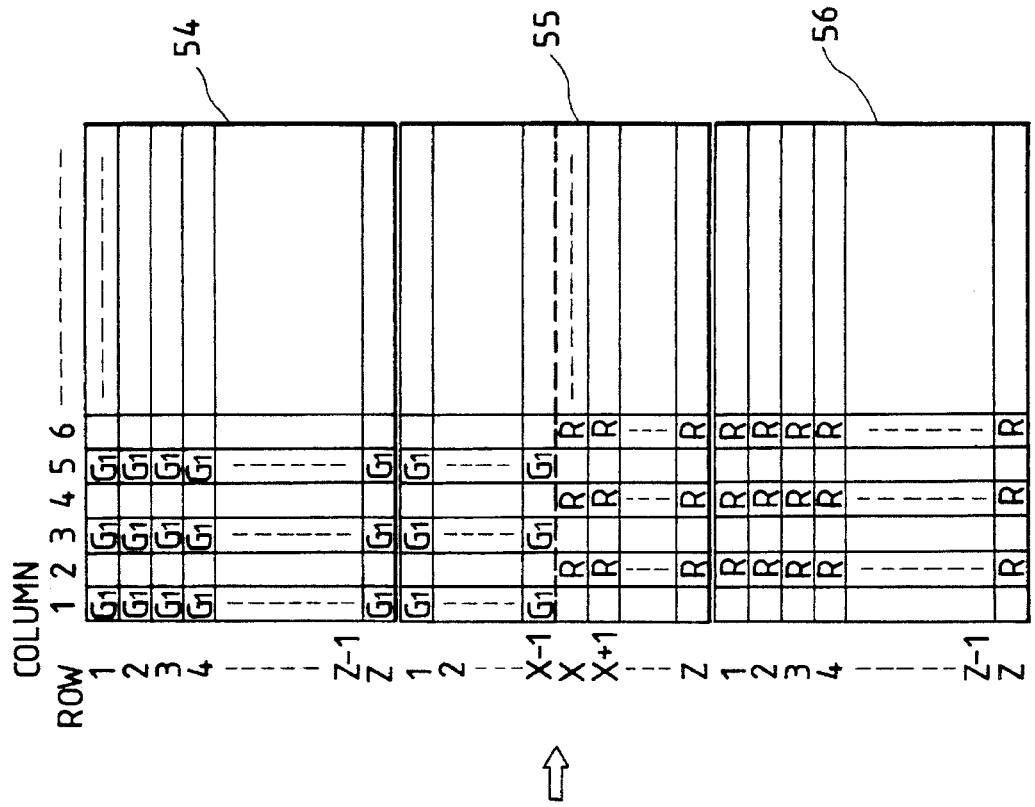
Figure 11A:
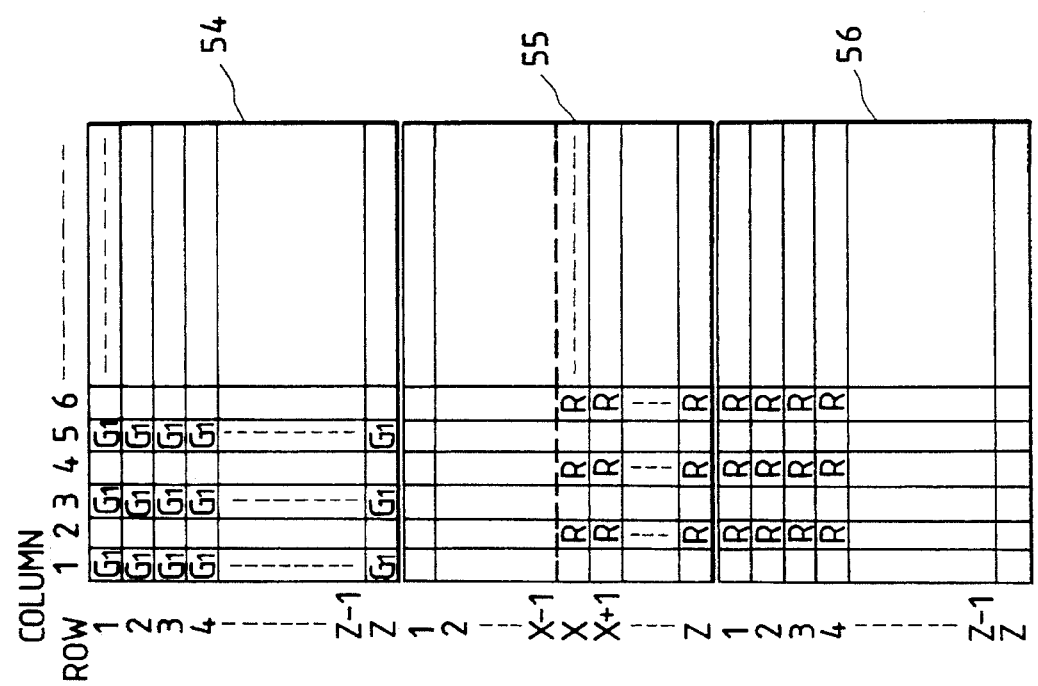

More specifically, as shown in FIG. 11A, $G_1$ data are sequentially stored at addresses corresponding to every other pixels in odd-numbered, i.e., 1st, 3rd, 5th, . . . , columns on a memory plane in a 1st chip 54, and R data are then stored in even-numbered, i.e., 2nd, 4th, 6th, . . . , coles from a 2nd chip 55 to a 3rd chip 56.

As shown in FIG. 11B, $G_1$ data are stored up to the Xth row of the 2nd chip, and R data are stored up to the Zth row of the 3rd chip (the Zth row is the last row on each chip memory plane, and X=Z/2).

In FIG. 11C, B data are stored in the even-numbered, i.e., 2nd, 4th, 6th, . . . , columns of the 1st chip 54 to fill blanks. Similarly, $G_2$ data are stored in the odd-numbered columns from the 2nd chip 53 to the 3rd chip 56. Then, ($G_1$,B) data are output to the D/A 48, and ($G_2$,R) data are read out to the D/A 49 like in the third embodiment. The following processing is the same as that in the third embodiment.

[Seventh Embodiment]

Figure 12:
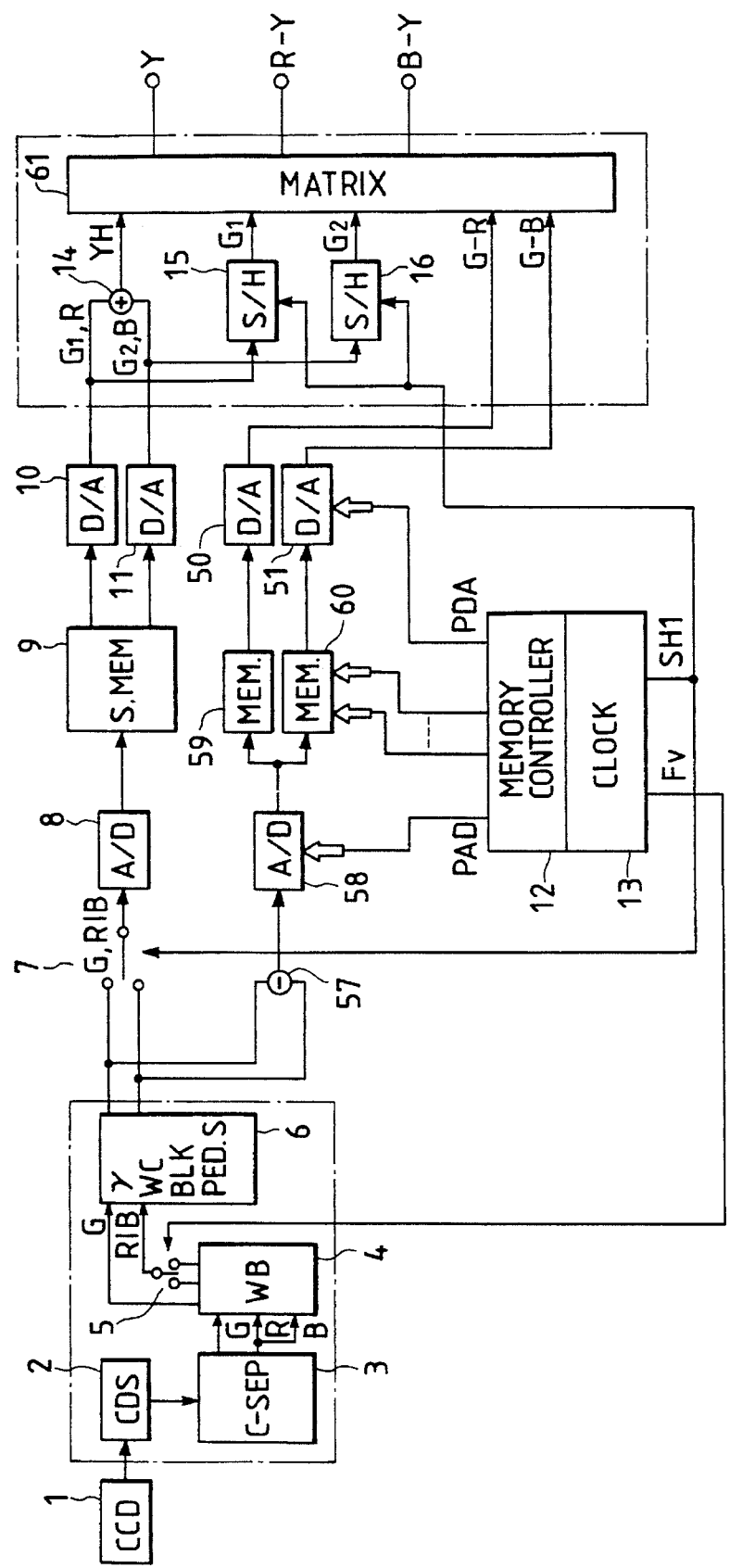
FIG. 12 is a block diagram showing the seventh embodiment of the present invention.

FIG. 12 is a block diagram showing the seventh embodiment of the present invention. In FIG. 12, blocks 1 to 16, 50, and 51 are the same as those in the first to fifth embodiments. An apparatus of this embodiment also includes an A/D 58, memories 59 and 60, and a matrix circuit 61 for outputting Y, R−Y, and B−Y based on YH, $G_1$, $G_2$, G−R, and G−B.

Outputs G ($G_1$|$G_2$) and R|B from the signal processing block 6 are converted to G−B|G−R signals by a subtracter 57, and are then converted into digital signals by the A/D 58. Thereafter, G−R signals are stored in the memory 59, and G−B signals are stored in the memory 60. In a read mode, the data in the memories 59 and 60 are simultaneously output to the D/As 50 and 51, and analog signals are then supplied to the matrix circuit 61. The matrix circuit 61 is obtained by omitting the blocks 25 and 26 from the circuit shown in FIG. 6. The G−R and G−B outputs are input to the YL MATRIX 27 and the C MATRIX 28, thus outputting YL, R−Y, and B−Y. Other operations are the same as those in the first embodiment.

[Eighth Embodiment]

In the first to seventh embodiments, the CCD having the color filter alignment shown in FIG. 4A has been used as an example. However, for example, a CCD having a color filter alignment shown in FIG. 13A or 13B may be used, and a system may be constituted using a corresponding signal processing circuit.

As described above, according to the embodiments of the present invention, false colors at a vertical color edge can be eliminated, no delay lines are required to output low-frequency color and luminance signals, and a low-profile quartz LPF and reduction of circuit cost can be realized.

Since the memories are used, output timings in the odd and even fields can be arbitrarily set. Therefore, in an electronic still camera having only a field head, frame data can be obtained.

[Ninth Embodiment]

The ninth embodiment of the present invention will be described below.

Figure 14:
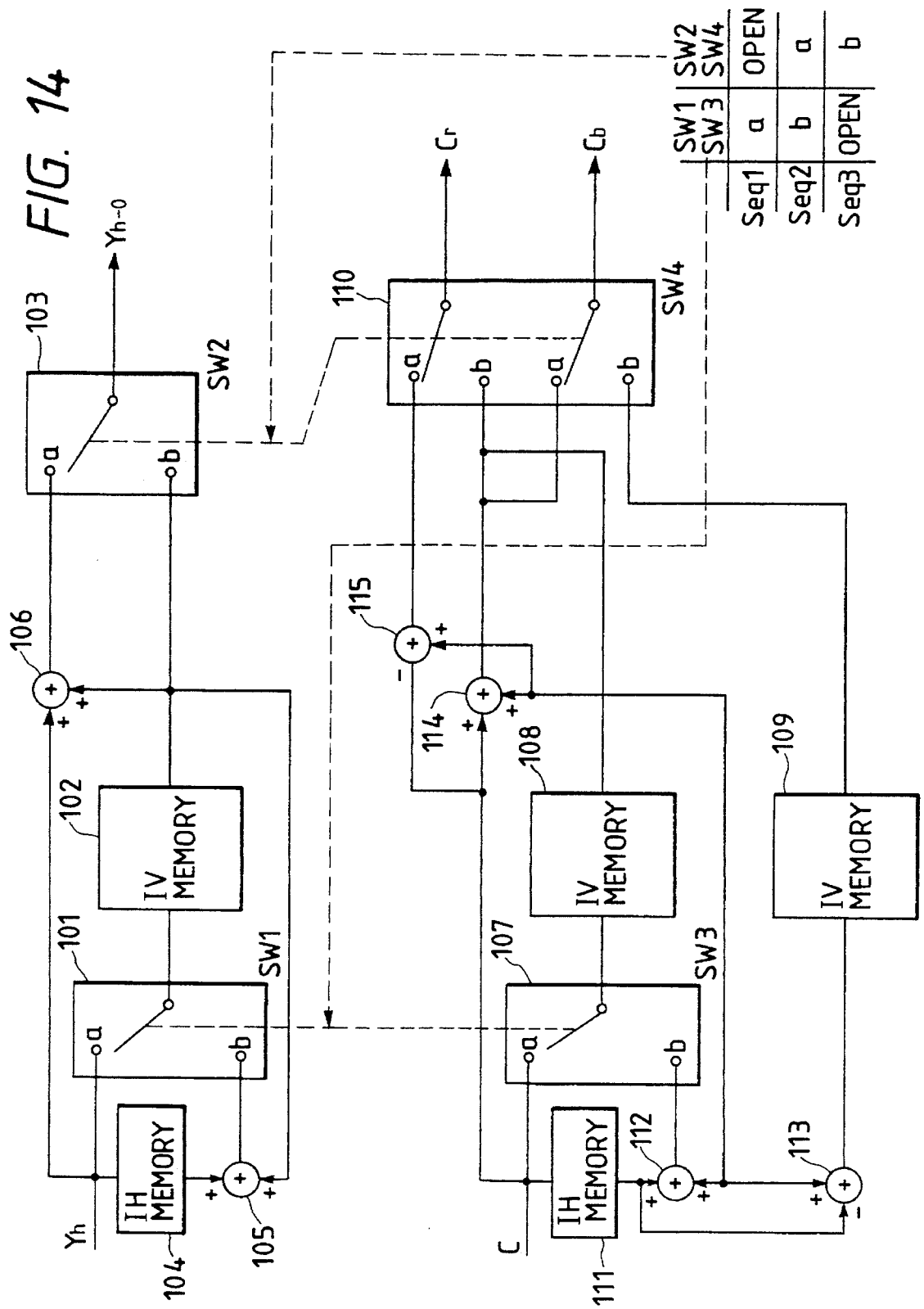
FIG. 14 is a block diagram showing a main part of the eighth embodiment of the present invention.
Figure 15:
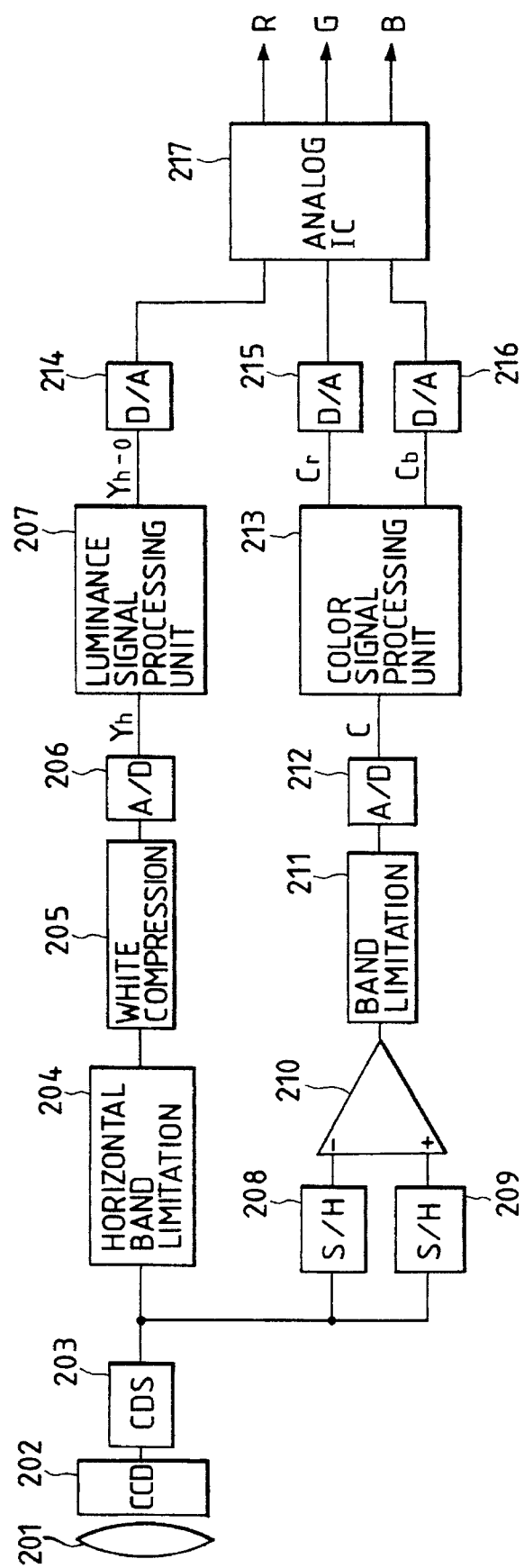
FIG. 15 is a diagram showing signal flows of the eighth embodiment.

FIG. 14 is a block diagram showing a main part of an "image pickup apparatus" according to the ninth embodiment of the present invention, and FIG. 15 is a diagram showing signal flows of the ninth embodiment.

In FIG. 15, an optical image of an object to be photographed formed on an image pickup element (CCD) 202 by a lens 201 is converted into electrical signals by the CCD 202, and the electrical signals are read by interlaced scanning. Color filters aligned as shown in, e.g., FIG. 2 are mounted on an image pickup unit of the CCD 202 in correspondence with pixels. The outputs from the CCD 202 are subjected to correlated double sampling by a CDS (correlated double sampling) circuit 203, and the sampled data are output. The outputs from the CDS circuit 203 are branched to luminance (Y) and color (C) processing operations.

In the Y signal processing, the signals are subjected to horizontal band limitation by a low-pass filter 204 to obtain wide-band luminance components $Y_h$. The output components are then subjected to white compression of a high-luminance portion by a compressor 205. The outputs from the compressor 205 are then converted to digital signals by an A/D converter 206, thus obtaining $Y_h$ components. The $Y_h$ components are converted to data in the same format as luminance data obtained by a movie camera by a luminance signal processing unit 207, and the obtained data are then output.

In the color signal processing, outputs from the CDS circuit 203 are sampled and held to be shifted by one pixel by sample & hold (S/H) circuits 208 and 209 which have a 180° phase difference between corresponding sampling clocks. The outputs from the S/H circuits 208 and 209 are input to a subtracter 210 and are then output as difference signals of adjacent pixels. However, for example, if the outputs from the CDS circuit 203 are signals in an Mg/Gr line in the first field, Mg–Gr or Gr–Mg signals are obtained as outputs of the subtracter 210. In the second field, the outputs from the CDS circuit 203 are signals in a Cy/Ye line, and Cy–Ye or Ye–Cy signals are obtained as the outputs of the subtracter 210. These two types of difference signals are subjected to band limitation by a low-pass filter 211 to obtain color signals. The color signals are A/D-converted into digital signals by an A/D converter 212.

In a color signal processing unit 213, proper processing for framing is performed, and color difference signals equivalent to signals obtained by a movie camera and expressed by equations (1) and (2) described above appear at its outputs. The luminance and color signals obtained in this manner are D/A-converted by D/A converters 214 to 216, and the analog signals are then subjected to proper matrix processing by an analog IC 217, thus finally outputting R, G, and B signals. At the output terminals of the A/D converters 206 and 212, only Mg/Gr data in the first field and only Cy/Ye data in the second field are obtained, and framing processing is required.

The luminance signal processing unit 207 and the color signal processing unit 213 for performing framing processing will be described in detail below with reference to FIG. 14.

Signals quantized by the A/D converter 206 or 212 are input as a $Y_h$ or C signal to the input terminal of each signal processing unit shown in FIG. 14.

The signal processing unit shown in FIG. 14 includes switches 101, 103, 107, and 110 which are switched in sequences Seq1 to Seq3, field memories 102, 108, and 109 for storing signals for one field interval, and 1H (horizontal scanning period) memories 104 and 111. The luminance signal $Y_h$ is processed in sequences Seq1 to Seq3 as follows:

<Seq1> During an interval in which first-field signals (having only Mg/Gr data) are input to the luminance signal processing unit 207, the switch 101 (SW1) is connected to a terminal a, and the switch 103 (SW2) is set in an open state. Therefore, during this interval, no luminance signal $Y_{h-o}$ is output, and first-field signals are stored in the first field memory 102.

<Seq2> During an interval in which second-field signals (having only Cy/Ye data) are input to the luminance signal processing unit 207, the switch 101 (SW1) is switched to a terminal b, and the switch 103 (SW2) is switched to a terminal a. With this operation, signals obtained by adding second-field signals and signals obtained by delaying the first-field signals by one field interval by an adder 106 are output to the terminal a of the switch 103. More specifically, in FIG. 2, (n)th and (m)th lines are added, so that (Mg+Gr)+(Cy+Ye) and (Gr+Mg)+(Cy+Ye) signals are alternately output every 1H. As a result, new first-field signals $Y_{h-o}$ equivalent to the first-field signals of the movie camera can be obtained.

At the same time, second-field signals are delayed by a 1H period by the 1H memory 104, and the delayed signals are added to the first-field signals output from the first field memory 102 by an adder 105. The sums are sequentially stored in the field memory 102. More specifically, in FIG. 2, (m)th and (n+1)th lines are added, and signals equivalent to the second-field signals of the movie camera are stored in the field memory 102.

<Seq3> Finally, when the second-field read interval is ended, the switch 101 (SW1) is opened, and the switch 103 (SW2) is switched to a terminal b, so that the sums stored in the field memory 102 are output from the switch SW2 as new second-field signals.

The color signals C are processed as follows:

<Seq1> During an interval in which first-field signals are input to the color signal processing unit 213, the switch 107 (SW3) is switched to a terminal a, and the switch 110 (SW4) is opened, so that the first-field signals are stored in the field memory 108.

<Seq2> During an interval in which second-field signals are input to the color signal processing unit 213, the switch SW3 is switched to a terminal b, and the switch SW4 is switched to a terminal a. At this time, an adder 114 outputs sums of the first-field signals delayed by one field interval and the second-field signals, and a subtracter 115 outputs differences between the first-field signals delayed by one field period and the second-field signals.

Since input signals to the color signal processing unit 213 correspond to difference signals of adjacent pixels obtained by the subtracter 210 shown in FIG. 15, Mg–Gr signals in the first field and Cy–Ye signals in the second field are input. Therefore, the adder 114 outputs:

(Mg–Gr)+(Cy–Ye)=(Mg+Cy)–(Gr+Ye) ≈2B–G

The subtracter 115 outputs:

(Mg–Gr)–(Cy–Ye)=(Mg+Ye)–(Gr+Cy) ≈2R–G

These two types of signals are equivalent to those obtained in the first field of the movie camera, and are output as new first-field signals $C_b$ and $C_r$.

At the same time, the second-field signals are delayed by $1_H$ by the 1H delay memory 111, and the delayed signals are added to the first-field signals delayed by one field interval by an adder 112, and the above two signals are subtracted by a subtracter 113. More specifically, signals given by (Gr–Mg)+(Cy–Ye)= (Gr+Cy)–(Mg+Ye)≈G–2R are stored in the field memory 108 via the terminal b of the switch SW3, and signals given by (Gr–Mg)–(Cy–Ye)=(Gr+Ye)–(Mg+Cy)≈G–2B are stored in the field memory 109. The field memory 109 is used to adjust a delay time since output signals from the field memory 108 and the subtracter 113 have a difference of one field interval.

<Seq3> Finally, when the second-field read period is ended, the switch 107 (SW3) is opened, and the switch 110 (SW4) is switched to a terminal b. Thus, the G–2R and G–2B signals are output from the switch SW4. Since these output signals have a different sign from that of the first-field signals output in <Seq2>, 2R–G and 2B–G signals are formed using a sign inverter (not shown), thus obtaining new second-field signals equivalent to those obtained in the second field of the movie camera.

The luminance signals and color difference signals obtained as described above are D/A-converted, and the analog signals are subjected to proper matrix processing by the analog IC 217, thereby obtaining desired R, G, and B signals.

In the above description, the color filters aligned as shown in FIG. 2 are used. The present invention is applicable to a case wherein color filters aligned as shown in FIG. 6 are used or pure color filters are used.

As described above, according to the embodiment of the present invention, first- and second-field signals read out in a frame sequential manner are added/subtracted using field memories, thereby obtaining signals quite equivalent to the first- and second-field signals obtained in a field read operation of, e.g., a movie camera.

Another embodiment of the luminance signal processing unit 207 and the color signal processing unit 213 for performing processing for interfield interpolation will be described below with reference to FIG. 17. In this embodiment, filters shown in FIG. 13A or 13B are used. Signals quantized by the A/D converters 206 and 212 are input as $Y_h$ or C signals to each signal processing unit shown in FIG. 17.

Figure 17:
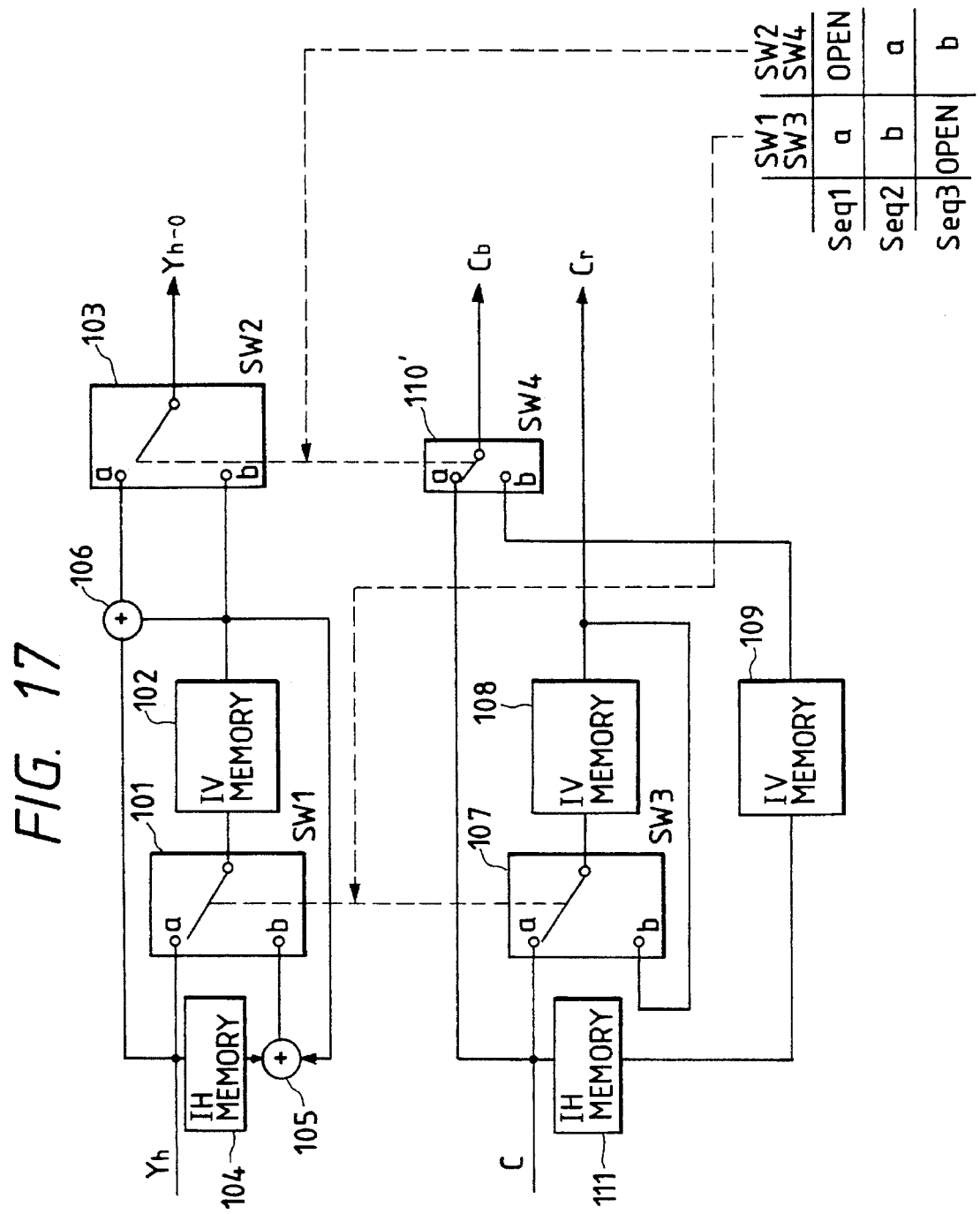
FIG. 17 is a block diagram showing a main part of the ninth embodiment of the present invention.

The signal processing unit shown in FIG. 17 includes switches 101, 103, 107, and 110 which are switched in sequences Seq1 to Seq3, field memories 102, 108, and 109 for storing signals for one field interval, and 1H (horizontal scanning period) memories 104 and 111.

The luminance signals $Y_h$ are processed as follows in sequences Seq1 to Seq3:

<Seq1> During an interval in which first-field signals (only R/G) are input to the luminance signal processing unit 207, the switch 101 (SW1) is switched to a terminal a, and the switch 103 (SW2) is opened. Therefore, during this period, no luminance signals $Y_{h-o}$ are output, and the first-field signals are stored in the field memory 102.

<Seq2> During an interval in which second-field signals (only B/G) are input to the luminance signal processing unit 207, the switch 101 (SW1) is switched to a terminal b, and the switch 103 (SW2) is switched to a terminal a. With this operation, sums of the second-field signals and the first-field signals delayed by one field interval by an adder 106 appear at the terminal a of the switch 103. More specifically, in FIG. 13, the 1st and 2nd lines are added, and signals given by $Y_1$=R +2G+B are output as new first-field signals $Y_{h-o}$. At the same time, the second-field signals are delayed by $1_H$ by the 1H memory 104, and the delayed signals are added to the first-field signals output from the field memory 105 by an adder 105. The sums are sequentially stored in the field memory 102. More specifically, in FIG. 13, 2nd and 3rd lines are added, and sum signals are stored.

<Seq3> Finally, when the second-field read interval is ended, the switch 101 (SW1) is opened, and the switch 103 (SW2) is switched to a terminal b. Thus, the sums stored in the field memory 102, i.e., signals given by $Y_2$=B+2G+R are output from the switch SW2 as new second-field signals $Y_{h-o}$.

The color signals C are processed as follows:

<Seq1> During an interval in which first-field signals are input to the color signal processing unit 213, the switch 107 (SW3) is switched to a terminal a, and the switch 110 (SW4) is opened. Thus, the first-field signals are stored in the field memory 108.

<Seq2> During an interval in which second-field signals are input to the color signal processing unit 213, the switch SW3 is switched to a terminal b, and the switch SW4 is switched to a terminal a. At this time, since input signals C of the color signal processing unit are difference signals of adjacent pixels by the subtracter 210 shown in FIG. 15, R–G signals in the first field and B–G signals in the second field are input. Therefore, the B–G signals from the switch 110 (SW4) and the R–G signals delayed by one field interval to be synchronized appear at the output terminals of the color signal processing unit. These two types of signals serve as new first-field color difference signals $C_b$ and $C_r$. At the same time, the output signals from the field memory 108 are stored again in the memory 108 itself via the terminal b of the switch SW3. The second-field signals are delayed by $1_H$ by the 1H memory 111, and the delayed signals are stored in the field memory 109.

<Seq3> Finally, when the second-field read interval is ended, the switch 107 (SW3) is opened, and the switch 110 (SW4) is switched to the terminal b, so that the B–G signals stored in the field memory 109 and the R–G signals stored in the field memory 108 are output. More specifically, in FIG. 13, the B–G signals obtained in the 2nd line and the R–G signals obtained in the 3rd line are synchronized, and are output as new second-field color difference signals $C_b$ and $C_r$.

The luminance signals $Y_{h-o}$ and color difference signals $C_b$ and $C_r$ obtained in this manner are D/A-converted, and the analog signals are subjected to proper matrix processing by the analog IC 217, thereby obtaining R, G, and B signals.

As described above, according to the above embodiment, even when color filters aligned in a mosaic pattern are mounted on a frame read (frame storage mode) type image pickup element, frame images can be reproduced using the field memories based on signals read out by interlaced scanning.

What is claimed is:

1. An image pickup apparatus for performing a frame read operation by interlaced scanning an image pickup element comprising color filters, comprising:

a. a luminance signal processing unit including means for storing first-field signals in a first field memory at a first timing, means for outputting a sum of the signal stored in said first field memory and a second-field signal as a new first-field signal at a second timing, means for storing a sum of the signal stored in said first field memory and a signal obtained by delaying the second-field signal by one horizontal scanning period in said first field memory at the second timing, and means for outputting the sum stored in said first field memory as a new second-field signal at a third timing; and b. a color signal processing unit including means for storing the first-field signal in a second field memory at the first timing, means for outputting a sum and a difference of the signal stored in said second field memory and the second-field signal as new first-field signals at the second timing, means for storing a sum of the signal stored in said second field memory and a signal obtained by delaying the second-field signal by one horizontal scanning period in said second field memory, and storing a difference between these signals in a third field memory at the second timing, and means for outputting the sum and difference stored in said second and third field memories as new second-field signals.

2. An apparatus according to claim 1, wherein said color filters include color filters which are changed at one-pixel periods in a vertical direction.

3. An apparatus according to claim 2, wherein said color filters include color filters of first and second colors which are alternately aligned in every other row in a horizontal direction, and color filters of third and fourth colors which are alternately aligned in remaining rows in the horizontal direction.

4. An apparatus according to claim 3, wherein the first and third colors are the same.

5. An apparatus according to claim 4, wherein the first and third colors include green.

6. An apparatus according to claim 4, wherein the first and third colors are aligned in the same columns.

7. An image pickup apparatus for performing a frame read operation by interlaced scanning an image pickup element comprising color filters, comprising:

a. a luminance signal processing unit including means for storing a first-field signal in a first field memory at a first timing, means for outputting a sum of the signal stored in said first field memory and a second-field signal as a new first-field signal at a second timing, means for storing a sum of the signal stored in said first field memory and a signal obtained by delaying the second-field signal by one horizontal scanning period in said first field memory at the second timing, and means for outputting the sum stored in said first field memory as a new second-field signal at a third timing; and b. a color signal processing unit including means for storing the first-field signal in a second field memory at the first timing, means for outputting the signal stored in said second field memory and the second-field signal as new first-field signals at the second timing, means for storing the signal stored in said second field memory at the first timing again in said second field memory at the second timing, means for storing a signal obtained by delaying the second-field signal by one horizontal scanning period in a third field memory at the second timing, and means for outputting the signal stored in said second field memory and the signal stored in said third field memory as new second-field signals at a third timing.

8. An apparatus according to claim 7, wherein said color filters include color filters which are changed at one-pixel periods in a vertical direction.

9. An apparatus according to claim 8, wherein said color filters include color filters of first and second colors which are alternately aligned in every other rows in a horizontal direction, and color filters of third and fourth colors which are alternately aligned in remaining rows in the horizontal direction.

10. An apparatus according to claim 9, wherein the first and third colors are the same.

11. An apparatus according to claim 10, wherein the first and third colors include green.

12. An apparatus according to claim 11, wherein the first and third colors are aligned in the same columns.

* * * * *

UNITED STATES PATENT AND TRADEMARK OFFICE
CERTIFICATE OF CORRECTION

PATENT NO. : 5,471,243
DATED : November 28, 1995
INVENTOR(S) : Masao Suzuki, et al.

It is certified that error appears in the above-identified patent and that said Letters Patent is hereby corrected as shown below:

Col. 1, line 45, change "$Y^1=C^1+C^2$" to -- $Y_1=C_1+C_2$ --.

Col. 1, line 46, change "$Y^2=C^3+C^4$" to -- $Y_2=C_3+C_4$ --,

Col. 1, line 62, change "y" to --$\gamma$--.

Col. 2, line 54, delete "10".

Col. 4, line 64, change "G,R'B" to -- G,R|B --.

Col. 8, line 7, delete "10".

Col. 12, line 26, change "coles" to -- columns --.

Signed and Sealed this

Eighteenth Day of June, 1996

Attest:

BRUCE LEHMAN

*Attesting Officer*    *Commissioner of Patents and Trademarks*